US012457948B2

(12) United States Patent
Roberts

(10) Patent No.: US 12,457,948 B2
(45) Date of Patent: Nov. 4, 2025

(54) SUBTERRANEAN IRRIGATION SYSTEM

(71) Applicant: Auguste Roberts, University Place, WA (US)

(72) Inventor: Auguste Roberts, University Place, WA (US)

(*) Notice: Subject to any disclaimer, the term of this patent is extended or adjusted under 35 U.S.C. 154(b) by 0 days.

(21) Appl. No.: 18/884,488

(22) Filed: Sep. 13, 2024

(65) Prior Publication Data

US 2025/0089636 A1 Mar. 20, 2025

Related U.S. Application Data

(60) Provisional application No. 63/582,802, filed on Sep. 14, 2023.

(51) Int. Cl.
*A01G 25/16* (2006.01)
*A01G 25/06* (2006.01)
*A01G 29/00* (2006.01)

(52) U.S. Cl.
CPC ........... *A01G 25/167* (2013.01); *A01G 25/06* (2013.01); *A01G 29/00* (2013.01)

(58) Field of Classification Search
CPC ...... A01G 25/167; A01G 25/16; A01G 25/06; A01G 29/00; Y10T 137/189; Y10T 137/1866
USPC ......................................................... 405/37
See application file for complete search history.

(56) References Cited

U.S. PATENT DOCUMENTS

| | | | | | |
|---|---|---|---|---|---|
| 3,114,243 | A | * | 12/1963 | Winters | E02B 13/00 137/625.42 |
| 3,981,446 | A | * | 9/1976 | Hunter | A01G 25/167 47/79 |
| 4,396,149 | A | * | 8/1983 | Hirsch | A01G 25/167 239/69 |
| 4,685,827 | A | * | 8/1987 | Sibbel | A01G 27/005 405/39 |
| 4,852,802 | A | * | 8/1989 | Iggulden | A01G 25/167 239/69 |
| 5,749,521 | A | * | 5/1998 | Lattery | A01G 25/167 239/69 |
| 6,401,742 | B1 | * | 6/2002 | Cramer | A01G 25/167 239/63 |

(Continued)

FOREIGN PATENT DOCUMENTS

CN 104705170 A * 6/2015
CN 106332735 A * 1/2017

(Continued)

*Primary Examiner* — Frederick L Lagman
(74) *Attorney, Agent, or Firm* — Command IP LLP; Michael Zarrabian

(57) ABSTRACT

Systems, devices, and methods including at least one irrigation device configured to deliver water to below a ground surface at a selected depth, the irrigation device including: a first watering pipe configured to be inserted into the ground at the selected depth to deliver water; a probe including at least one sensor configured to be inserted into the ground, wherein the at least one sensor is configured to detect data of the ground and transmit the detected data to an electrical controller circuitry; and a control box configured to receive the detected data via the electrical controller circuitry and control an opening and closing of an inlet valve between the first watering pipe and a water main, based on the received data.

13 Claims, 26 Drawing Sheets

(56) References Cited

U.S. PATENT DOCUMENTS

| | | | |
|---|---|---|---|
| 6,615,653 B1* | 9/2003 | Hocking | E02D 1/027 73/152.01 |
| 8,979,431 B2* | 3/2015 | Bayley | A01G 25/02 405/37 |
| 2007/0157512 A1* | 7/2007 | Wein | G01N 27/225 137/78.3 |
| 2007/0277879 A1* | 12/2007 | Anderson | A01G 25/16 137/78.3 |
| 2008/0219768 A1* | 9/2008 | Sanchez | E02D 29/0258 405/37 |
| 2016/0048135 A1* | 2/2016 | Hill | G05B 19/042 405/37 |

FOREIGN PATENT DOCUMENTS

| | | | | |
|---|---|---|---|---|
| CN | 107372050 A | * | 11/2017 | A01G 25/02 |
| CN | 108496760 A | * | 9/2018 | A01C 23/047 |
| CN | 112167014 A | * | 1/2021 | |
| CN | 113615546 A | * | 11/2021 | |
| CN | 113642269 A | * | 11/2021 | A01G 25/00 |
| CN | 114198697 A | * | 3/2022 | |
| CN | 116530283 A | * | 8/2023 | |
| KR | 102095401 B1 | * | 4/2020 | |

* cited by examiner

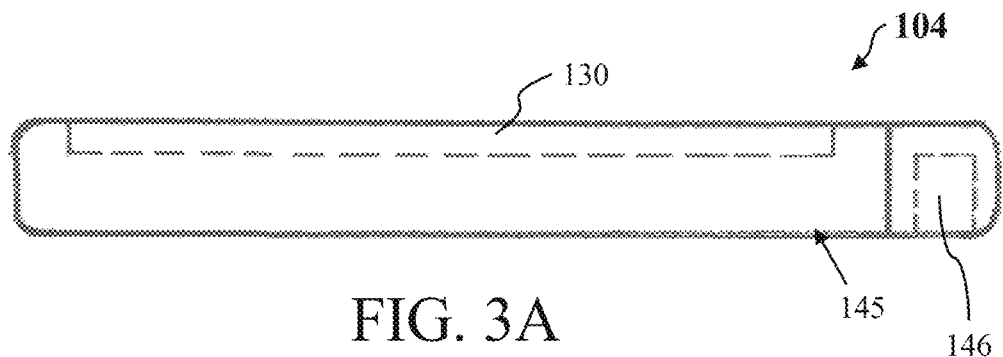
FIG. 3A
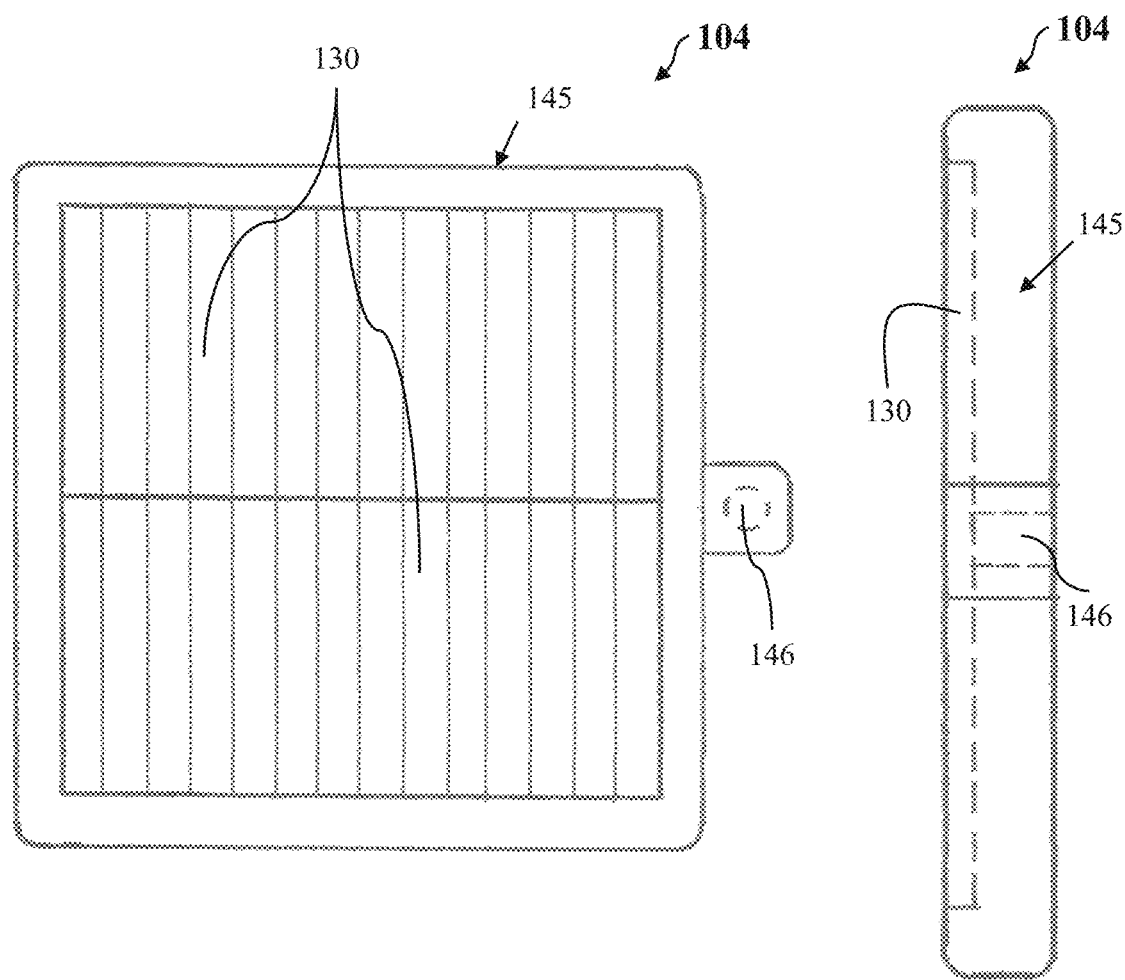
FIG. 3B
FIG. 3C

SUBTERRANEAN IRRIGATION SYSTEM

CROSS-REFERENCE TO RELATED APPLICATIONS

This application claims priority to and the benefit of U.S. Provisional Patent Application No. 63/582,802, filed Sep. 14, 2023, the contents of which are hereby incorporated by reference herein for all purposes.

All documents mentioned in this specification are herein incorporated by reference to the same extent as if each individual document was specifically and individually indicated to be incorporated by reference.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

TECHNICAL FIELD

Embodiments relate generally to an irrigation system, and more particularly to a subterranean irrigation system.

BACKGROUND

Conventional irrigation systems have been in use for many years. Unfortunately, most of these systems are complex and require multiple components. In addition, conventional irrigation systems, such as surface and sprinkler methods, often suffer from inefficiencies including water wastage through evaporation and runoff.

Given the current state of the art and the drawbacks of existing irrigation systems, there is a need for a subterranean irrigation system that is simpler and more efficient, which may also address these inefficiency issues by delivering water directly to plant roots below the soil surface, reducing evaporation and runoff.

SUMMARY

An embodiment may include a system comprising at least one irrigation device configured to deliver water to below a ground surface at a selected depth, the irrigation device including: a first watering pipe configured to be inserted into the ground at the selected depth to deliver water; a probe including at least one sensor configured to be inserted into the ground, wherein the at least one sensor is configured to detect data of the ground and transmit the detected data to an electrical controller circuitry; and a control box configured to receive the detected data via the electrical controller circuitry and control an opening and closing of an inlet valve between the first watering pipe and a water main, based on the received data.

In another embodiment, the at least one sensor may include a middle positioned sensor located at the selected depth and at least one of a top positioned sensor located above the selected depth and a bottom positioned sensor located below the selected depth, and wherein when the at least one of the top positioned sensor and the bottom positioned sensor detects moisture while the middle positioned sensor detect moisture, the at least one of the top positioned sensor and the bottom positioned sensor that detects moisture may transmit a signal to the electrical controller circuitry to close the inlet valve.

In another embodiment, the watering pipe may have an elongated, longitudinally extending slot opening within a part of which the probe is secured external to the watering pipe.

In another embodiment, the control box may include watering pipe housing receiving and housing a top distal end of the watering pipe, and wherein the watering pipe may be supplied water through a conduit channel connected to the inlet valve disposed inside the control box, and wherein the watering pipe housing may be a longitudinally extending cylindrical hole with a longitudinally extending protruding portion formed on an inner surface of the hole.

In another embodiment, the control box may include a probe housing positioned at a bottom of the control box for receiving and housing a top distal end of the probe, and wherein the probe housing may be a longitudinally extending cylindrical hole positioned inside the longitudinally extending protruding portion of the watering pipe housing.

In another embodiment, the watering pipe may have an elongated hollow cylindrical shape that includes a top longitudinally extending slot and a bottom longitudinally extending slot that is extended from a bottom end of the top longitudinally extending slot and has a narrower width than the top longitudinally extending slot, wherein a top portion of the watering pipe may be inserted into the watering pipe housing while the top longitudinally extending slot of the watering pipe receives the protruding portion of the watering pipe housing, and wherein a dividing edges between the top and bottom longitudinally extending slot may function as a stops upon which the protruding portion of the watering pipe housing sits and the bottom side of the control box rests.

In another embodiment, the probe housing positioned inside the longitudinally extending protruding portion may be aligned with the second longitudinally extending slot, and wherein a top distal end of the probe may be inserted within the probe housing, and a top section of the probe below the top distal end is embedded within the second longitudinally extending slot.

In another embodiment, the watering pipe may include at least one projection that linearly extends longitudinally from a bottom distal end opening of the watering pipe and is configured to support an excavated hole of the ground.

In another embodiment, the system may further comprise at least one second watering pipe, and wherein any one of the at least one irrigation device and the at least one second watering pipe may be connected to each other in series.

In another embodiment, the at least one irrigation device may be a plurality of irrigation devices, and wherein the plurality of irrigation devices may be connected to each other via at least one of a series circuitry and a parallel circuitry.

In another embodiment, the irrigation device may further include a water jet mechanism extended through the watering pipe from the inside of the control box toward a water egressing opening of the watering pipe, wherein one end of the water jet mechanism may be inserted into the control box, and the other end may be exposed through the water egressing opening, and wherein the water jet mechanism may be configured to form an air pocket into the ground.

An embodiment may include a method comprising: taking first readings of moisture level in soil by at least one hydrometer sensor of an irrigation system; determining, by a microcontroller unit, if the moisture level of the soil is at or beyond a predetermined level opening a water valve if the moisture level of the soil is below the predetermined level; and taking additional readings of moisture level in the soil by the at least one hydrometer sensor to determine, by the microcontroller unit, at least one of normal operation of the irrigation system and a length of time period for which the water valve opens.

In another embodiment, the method may further comprise transmitting, by the microcontroller unit, any one of a normal signal or a malfunctioning signal to an external device depending on the second readings.

In another embodiment, the method may further comprise commencing a timer operation for a predetermined time period while the water valve opens if the irrigation system operates properly; and closing the water valve once the predetermined time period ends.

In another embodiment, the step of taking additional readings may include taking third readings of moisture level in the soil by the at least one hydrometer sensor after the water valve opens for the predetermined time period; and determining, by the microcontroller unit, if the moisture level after the water valve opens is at or beyond a predetermined level.

In another embodiment, the step of taking additional readings may include preprogramming, by the microcontroller unit, a length of a secondary time period to reopen the water valve if the moisture level after the water valve opens is below the predetermined level.

An embodiment may include a system comprising at least one irrigation device configured to deliver water to below a ground surface, the irrigation device including a watering pipe configured to be inserted into the ground and including: at least one egressing opening formed at a side of the watering pipe, and a water jet mechanism configured to form an air pocket into the ground in front of the at least one egressing opening; and a probe extended along the watering pipe and configured to detect data of the ground.

In another embodiment, the watering pipe may include at least one projection extending downwards from a bottom distal end opening of the watering pipe, and the each of the at least one projection may have a concave surface configured to form an air pocket into the ground.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIGS. 3A to 3D depict the various views of a solar panel of the irrigation device of the subterranean irrigation system illustrated in FIGS. 1 to 2C in accordance with one or more embodiments;

DETAILED DESCRIPTION OF THE INVENTION

Figure 1:
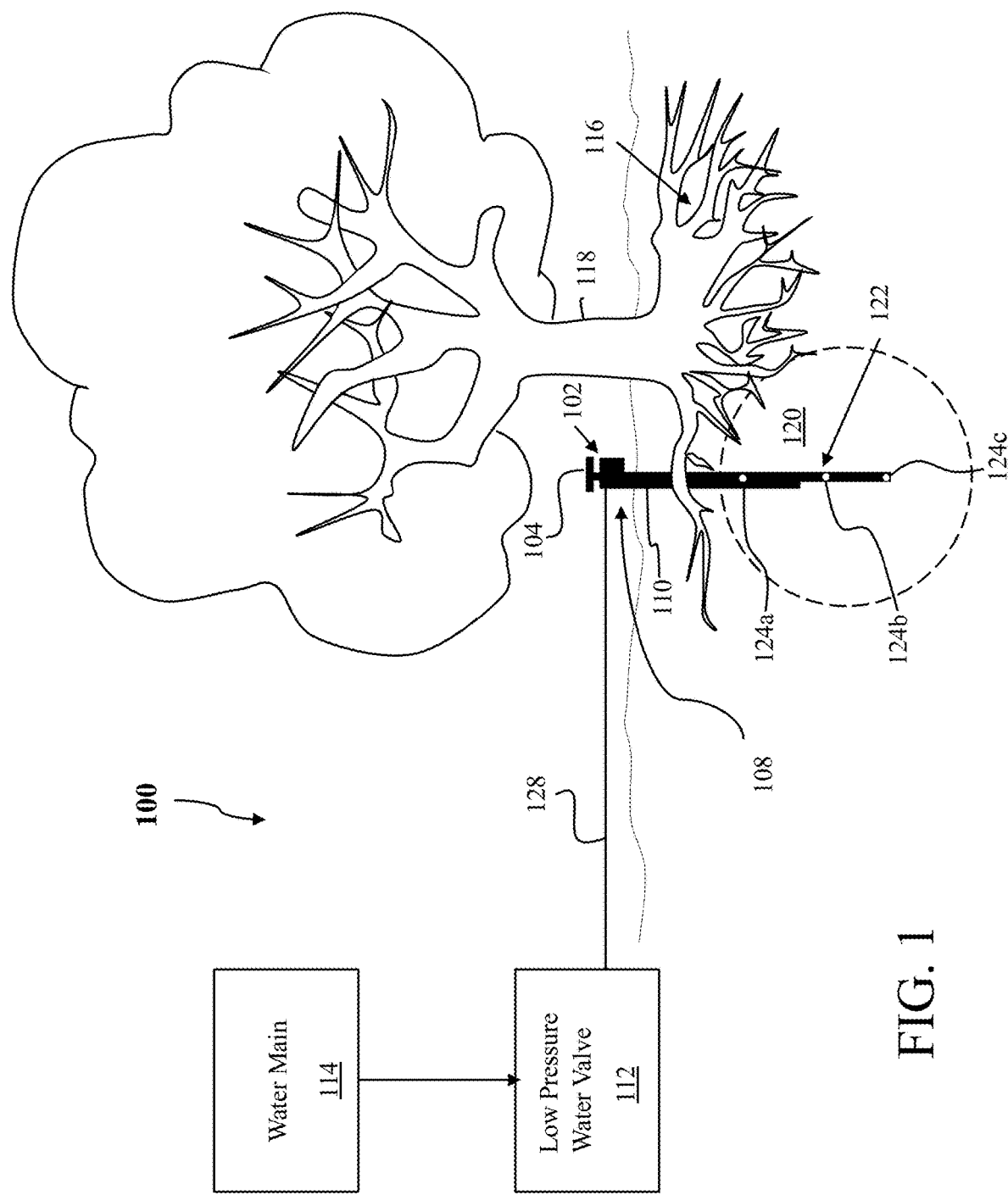
FIG. 1 depicts a subterranean irrigation system in accordance with one or more embodiments.

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

For purposes of illustration, programs and other executable program components are illustrated herein as discrete blocks, although it is recognized that such programs and components may reside at various times in different storage components, and are executed by the data processor(s) of the computers. Further, each block within a flowchart (if a flowchart is used) may represent both method function(s), operation(s), or act(s) and one or more elements for performing the method function(s), operation(s), or act(s). In addition, depending upon the implementation, the corresponding one or more elements may be configured in hardware, software, firmware, or combinations thereof.

In the description given below and or the corresponding set of drawing figures, when it is necessary to distinguish the various members, elements, sections/portions, components, parts, or any other aspects (functional or otherwise) or features or concepts or operations of a device(s) or method(s) from each other, the description and or the corresponding drawing figures may follow reference numbers with a small alphabet character such as (for example) "sensor 124a, 124b, 124c. and etc." If the description is common to all of the various members, elements, sections/portions, components, parts, or any other aspects (functional or otherwise) or features or concepts or operations of a device(s) or method(s) such as (for example) to all sensor 124a, 124b, 124c. and etc., then they may simply be referred to with reference number only and with no alphabet character such as (for example) "sensors 124 and/or sensor 124."

As further detailed below, one or more embodiments of the present invention provide a subterranean irrigation system that is simple and quick to setup.

FIG. 1 is a non-limiting, exemplary illustration of a subterranean irrigation system in accordance with one or more embodiments of the present invention. As illustrated, a subterranean irrigation system 100 may comprise an irrigation device 102, which delivers water to below a ground surface at a selected depth. More specifically and as further detailed below, the irrigation device 102 may include a watering pipe 110 and a probe 122, and at least portion of the watering pipe 110 and a probe 122 may be inserted into a pre-excavated hole in the ground at the selected depth.

The irrigation device 102 of the subterranean irrigation system 100 may include a solar power module 104 associated with an electrical controller circuitry (106, FIG. 7) housed within a control box 108.

The irrigation device 102 may further include the watering pipe 110 (further detailed below) for delivery of low-pressure water via a low-pressure valve 112 from a water main 114 to below ground surface. The watering pipe 110 may be inserted into the excavated ground hole to a selected depth depending on a root system 116 of a plant 118 being watered.

The low pressure water may be delivered to the watering pipe 110 through a conventional plumbing 128, and the delivered water dripping down the watering pipe 110 may reach to underground near the root system 116 of plant 118. As further detailed below, the amount, rate, and duration of water delivered may be selected and set based on watering requirements. As illustrated, depending on the soil properties, delivered water may spread in all directions, forming a spherical underground "reservoir" 120 near or at the root system 116 of plant 118.

The irrigation device 102 may further include the probe 122 associated with and connected to the watering pipe 110. The probe 122 may include one or more embedded sensors 124a, 124b, 124c positioned underground and communicatively associated with the electrical controller circuitry (106, FIG. 7) housed within the control box 108. The physical connection of the probe 122 with the watering pipe 110 is detailed below with reference to FIGS. 2A and 2B.

As water is dripped down the watering pipe 110 and dispersed in all directions, water will eventually come to contact a generally middle positioned sensor 124b. The sensor 124b may be configured to trigger a signal, or sensor data, to the electrical controller circuitry (106, FIG. 7) that water is being delivered.

When subterranean soil eventually saturates with sufficient water 120, a top most moisture sensor 124a and/or a bottom most moisture sensor 124c may be trigger due to detection of moisture and transmit a signal to the electrical controller circuitry (106, FIG. 7) to shut off the water main 114, if need be.

Position, number, and types of the one or more embedded sensors 124a, 124b, 124c on the probe 122 may be varied. For example, different types of sensors 124a, 124b, 124c may be used depending on the types of ambient properties of soil, water, air, etc. being detected. For example, a first set of the sensors 124a, 124b, 124c may detect moisture, while a second set of sensors (not shown) may detect temperature, or PH levels of soil, etc.

Figure 2A:
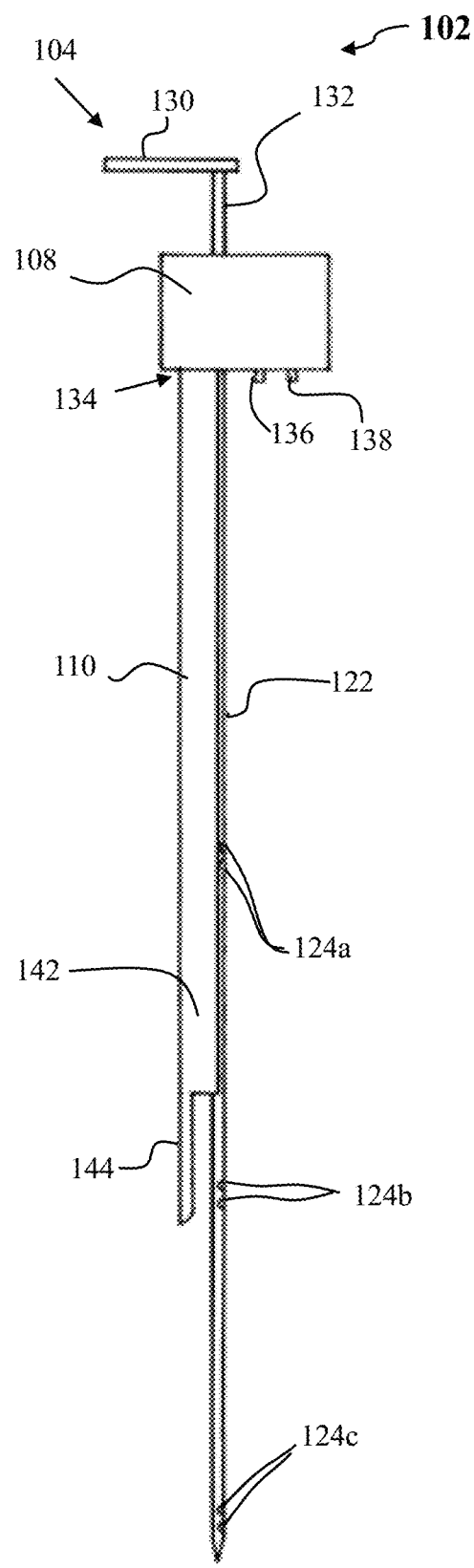
FIGS. 2A to 2C depict the various views of an irrigation device of the subterranean irrigation system illustrated in FIG. 1 in accordance with one or more embodiments.
Figure 2B:
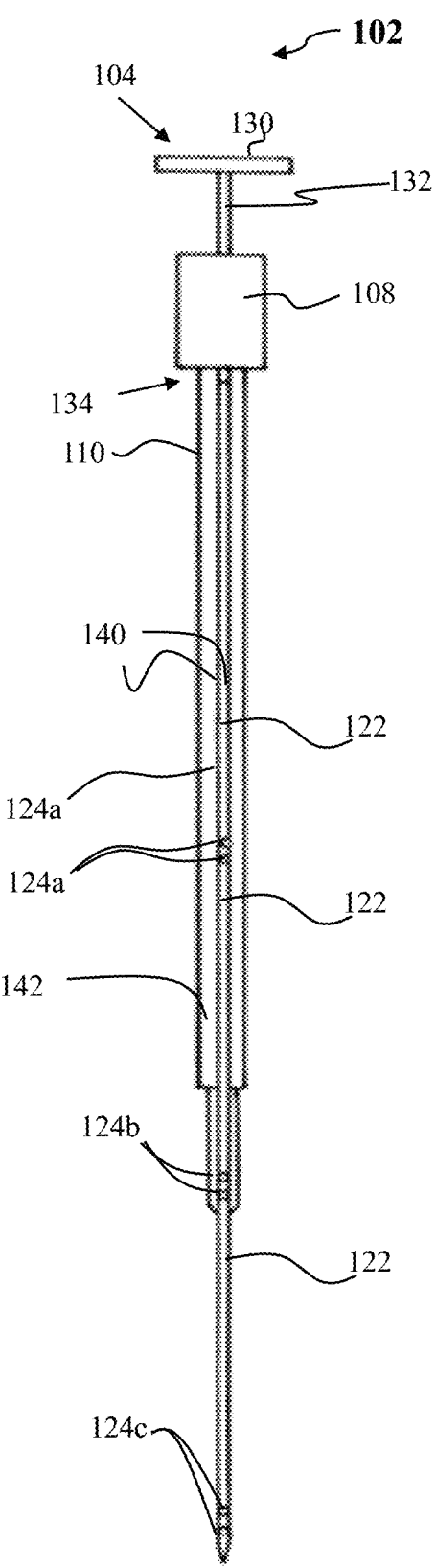
Figure 2C:
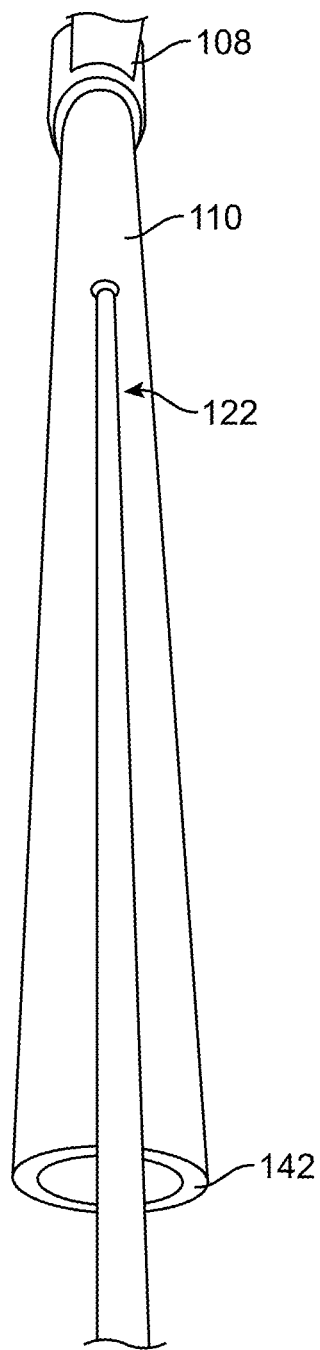

FIGS. 2A to 2C are non-limiting, exemplary illustrations of the various views of an irrigation device of the subterranean irrigation system illustrated in FIG. 1 in accordance with one or more embodiments of the present invention. FIG. 2A depicts a side view of the irrigation device 102, FIG. 2B depicts a front view of the irrigation device 102, and FIG. 2C depicts a perspective view of the irrigation device 102.

As illustrated in FIGS. 1 to 2C, a solar power module 104 of irrigation device 102 is comprised of a solar panel 130 connected to the control box 108 by a solar panel supporting post 132, with the control box 108 connected to a top distal end 134 of the watering pipe 110.

The control box 108 may comprise of an inlet opening 136 that defines a water inlet for ingress of water from the low-pressure valve 112 into the irrigation device 102. Optionally and as further detailed below, the control box 108 may further comprise of an optional outlet opening 138 that defines a water outlet for egress of water to optional downstream irrigation systems (further detailed below).

As illustrated in FIGS. 1A to 2C and further detailed below, the watering pipe 110 may have an elongated, longitudinally extending slot opening 140 within a part of which the probe 122 may be secured external to the watering pipe 110. In this non-limiting, exemplary embodiment, the probe 122 may extend beyond a distal end opening 142 of the watering pipe 110. In some embodiments, as further detailed below, the watering pipe 110 may further include one or more projection (144, FIGS. 5A to 5F, and 10B) that linearly extends longitudinally from the distal end opening 142 of the watering pipe 110.

Figure 2D:
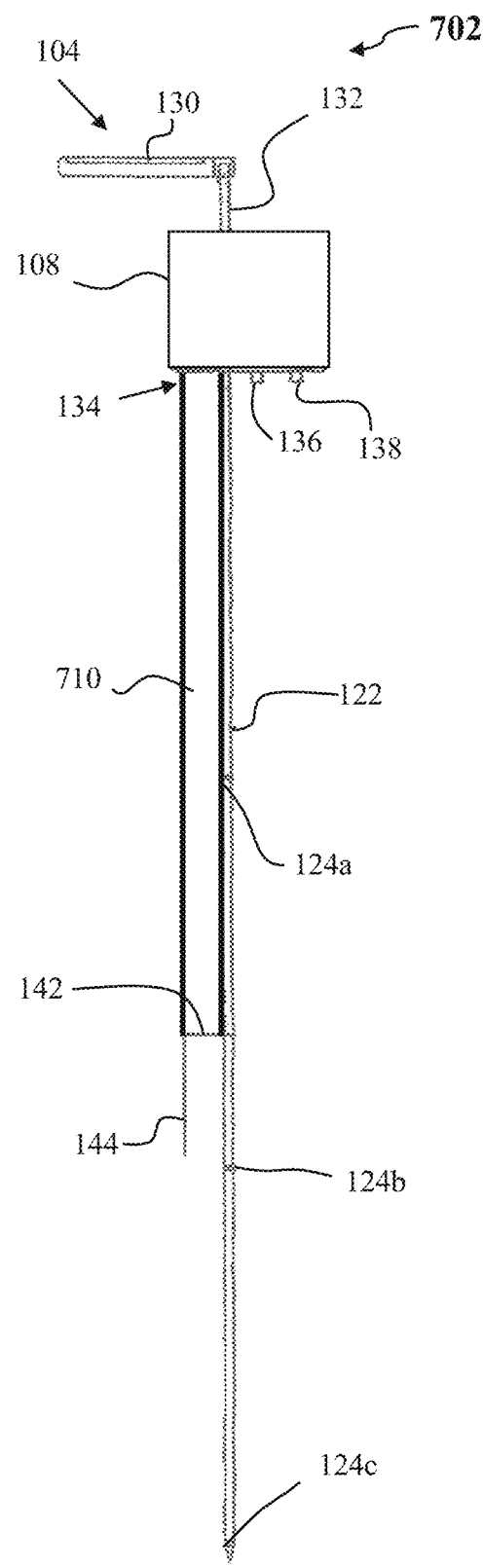
FIGS. 2D and 2E depict the various views of an irrigation device of a subterranean irrigation system in accordance with one or more embodiments.
Figure 2E:
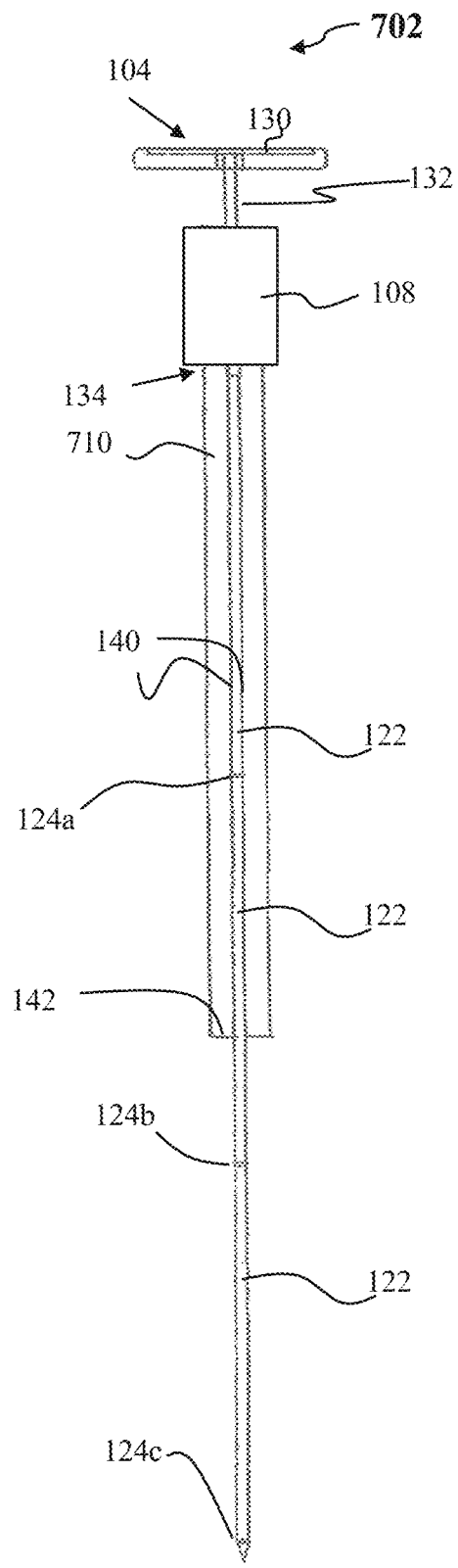

FIGS. 2D and 2E depict the various views of an irrigation device of a subterranean irrigation system in accordance with another embodiment of the present invention. FIG. 2D depicts a side view of the irrigation device 702, and FIG. 2B depicts a front view of the irrigation device 702. The height of watering pipe 710, the number and/or locations of sensors 124a, 124b, 124c may be adjusted according to needs.

FIGS. 3A to 3D are non-limiting, exemplary illustrations of the various views of a solar panel of the irrigation device of the subterranean irrigation system illustrated in FIGS. 1 to 2C in accordance with one or more embodiments of the present invention.

As illustrated in FIGS. 1 to 3D, a solar panel module 104 may include a solar panel frame 145 with which one or more solar panels 130 are secured. The solar panel frame 145 may include a mounting portion 146 for attaching the solar panel frame 145 onto the control box 108 by the solar panel supporting post 132.

Figure 3D:
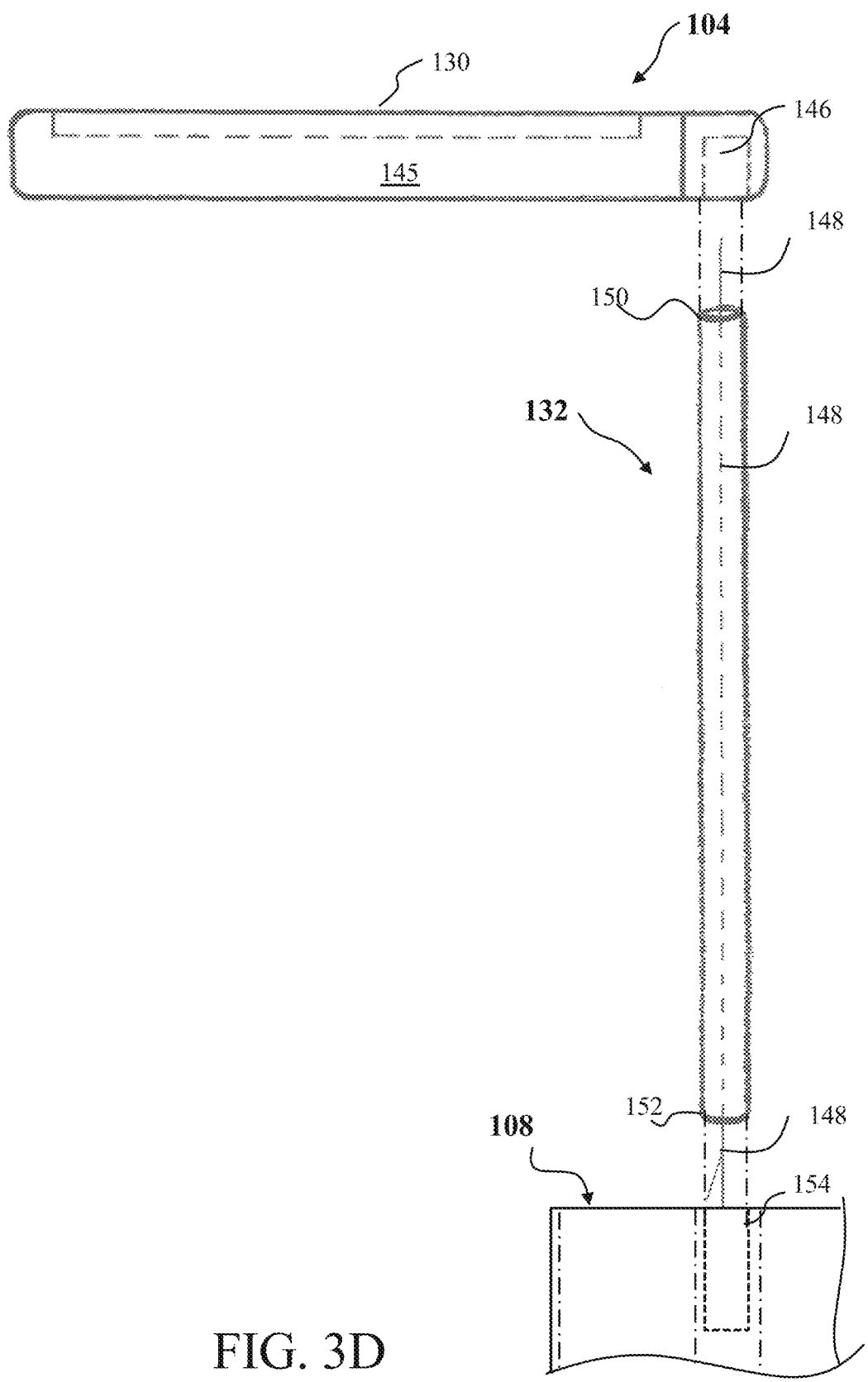

As shown in FIG. 3D, the solar panel supporting post 132 may comprised a hollow cylindrical conduit for housing a wire-harness 148 between the solar panel 130 and the control box 108. The solar panel frame mounting portion 146 may include a recessed cavity for receiving a top distal end 150 of the solar panel supporting post 132. A lower distal end 152 of the solar panel supporting post 132 may be inserted within a supporting post housing 154 inside the control box 108.

Figure 4A:
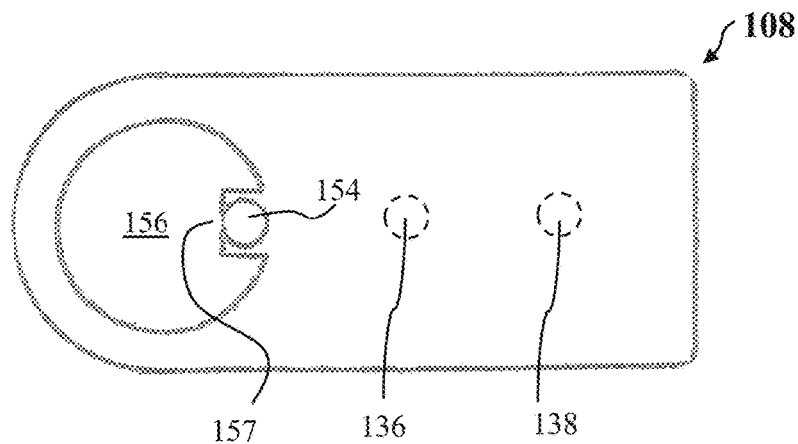
FIGS. 4A to 4E depict the various views of a control box of the irrigation device of the subterranean irrigation system illustrated in FIGS. 1 to 3D in accordance with one or more embodiments.
Figure 4B:
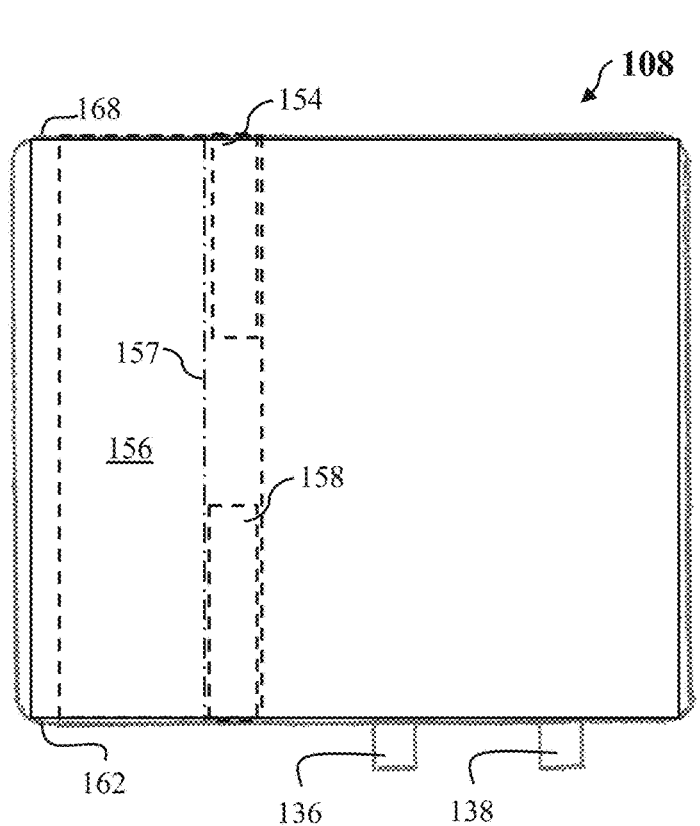
Figure 4C:
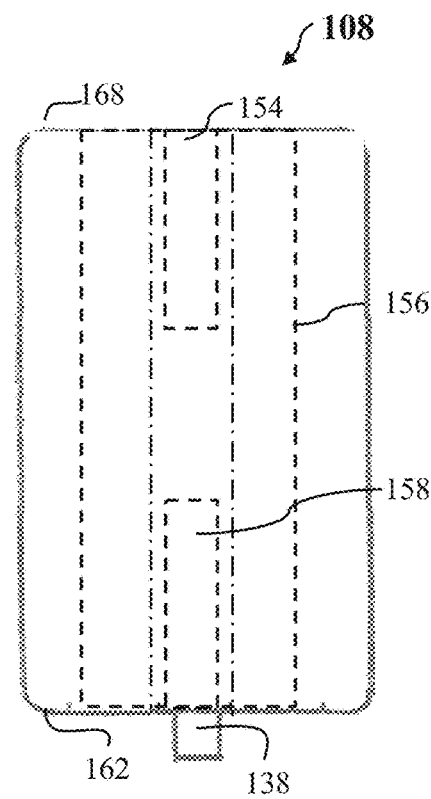
Figure 4D:
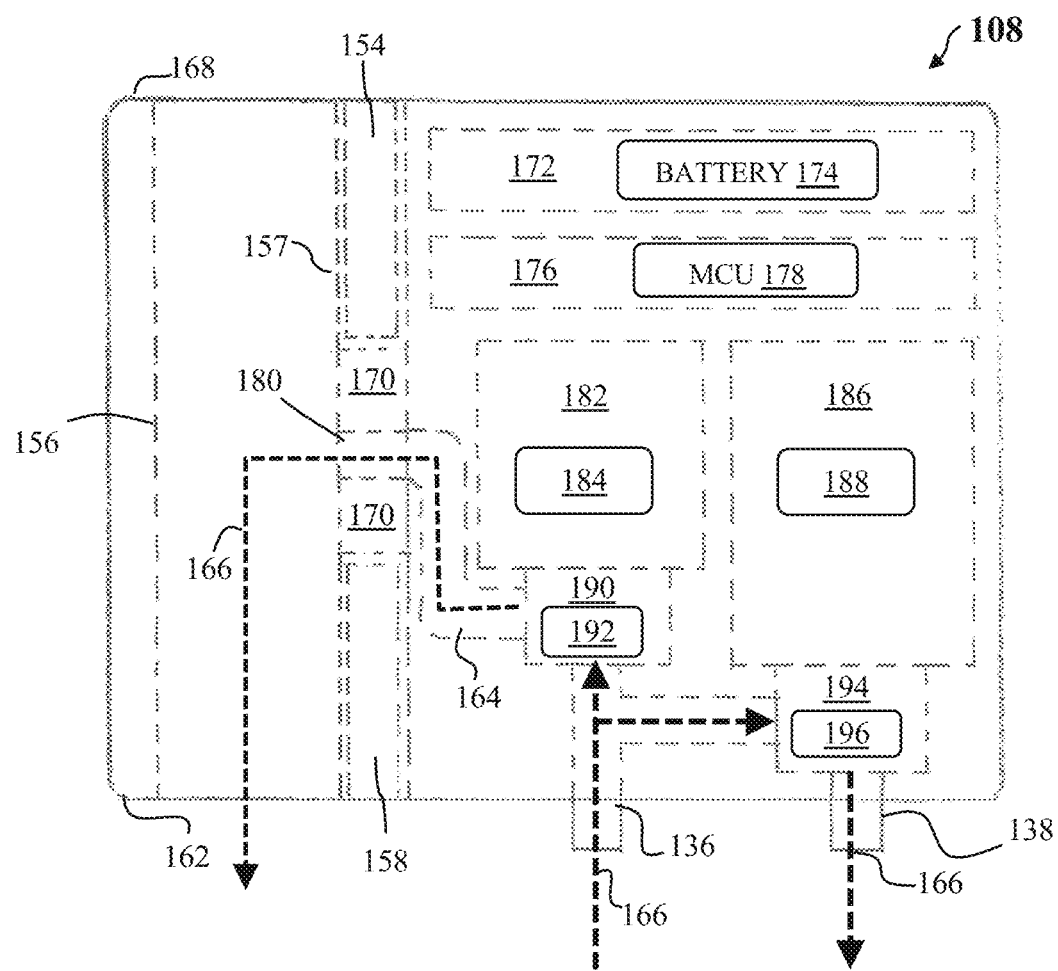
Figure 4E:
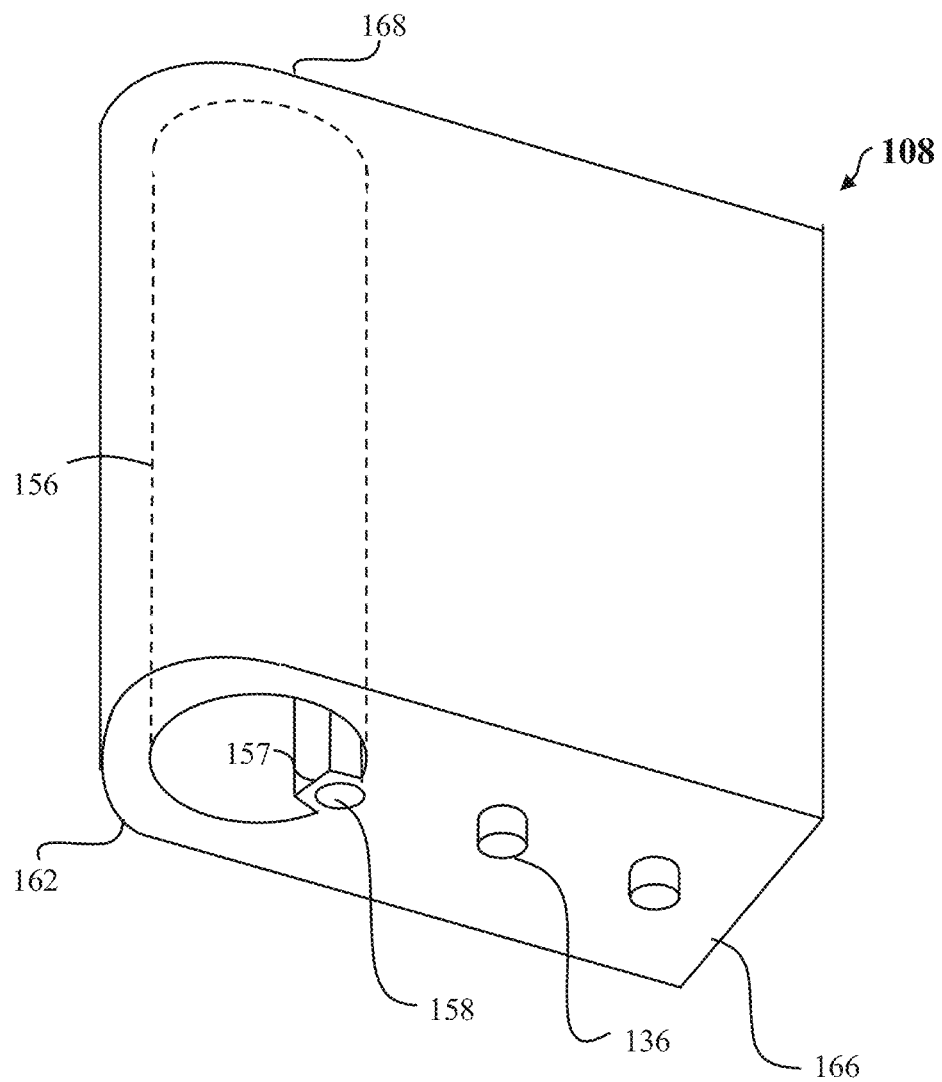

FIGS. 4A to 4E are non-limiting, exemplary illustrations of the various views of a control box of the irrigation device of the subterranean irrigation system illustrated in FIGS. 1 to 3D in accordance with one or more embodiments of the present invention. FIG. 4A depicts a top view of the control box 108, FIG. 4B depicts a side view of the control box 108, FIG. 4C depicts a front view of the control box 108, FIG. 4D depicts internal components within the control box 108 from a side view, and FIG. 4E depicts a bottom perspective view of the control box 108.

As illustrated in FIGS. 1 to 4E, the control box 108 may comprise of a through-opening that defines a watering pipe housing 156 for receiving a top distal end (134, FIGS. 2A and 2B) of the watering pipe (110, FIGS. 2A and 2B). The watering pipe housing 156 may be a longitudinally extending cylindrical hole with a longitudinally extending protruding portion 157 formed on an inner surface of the hole.

The control box 108 may further include the supporting post housing 154 at a top 168 of the control box 108 for receiving and housing the solar panel supporting post (132, FIGS. 2A, 2B, and 3D), and a probe housing 158 positioned at a bottom 162 of the control box 108 for receiving and housing a top distal end 160 of the probe 122. The probe housing 158 may be a longitudinally extending cylindrical hole positioned inside the longitudinally extending protruding portion 157. In some embodiments, the probe housing 158 may be positioned opposite to the supporting post housing 154 but is not limited thereto.

The control box 108 may further include an inlet opening 136 and an optional outlet opening 138. The inlet opening 136 may define a water inlet for ingress of water from the water main (114, FIG. 1) into the control box 108 through the low pressure water valve (112, FIG. 1) and the plumbing (128, FIG. 1). The optional outlet opening 138 may define a water outlet for egress of water to the outside of the irrigation device 102.

The control box 108 may further include a conduit channel 164 extended inside the control box 108 to allow waterflow (shown by arrows 166) from the inlet opening 136 into the watering pipe (110, FIGS. 2A and 2B) housed within the watering pipe housing 156. One end of the conduit channel 164 may be connected to the inlet opening 136, 138, and the other end of the conduit channel 164 may be connected to the watering pipe (110, FIGS. 2A and 2B) through an opening 180 positioned between solid portions 170 of the control box 108. In some embodiments, the conduit channel 164 may be connected to the optional outlet opening 138.

As best illustrated in FIG. 4D, the control box 108 may further include one or more chambers for housing various electrical components of irrigation device. A first chamber 172 may be used for housing a battery 174, and a second chamber 176 may be used for housing a microcontroller unit (MCU) 178.

A third chamber 182 may be used for housing an inlet valve actuator mechanism 184 (e.g., a first motor), and a fourth chamber 186 may be used for housing an outlet valve actuator mechanism 188 (e.g., a second motor). Fifth and sixth chambers 190 and 194 may be used for housing respective an inlet valve 192 and an outlet valve 196. The inlet valve actuator mechanism 184 may be connected to the inlet valve 192 and configured to actuate the inlet valve 192. The inlet valve 192 may be connected to the inlet opening 136 through the conduit channel 164 and configured to control the amount of water supplied to the watering pipe (110, FIGS. 2A and 2B) from the inlet opening 136. The outlet valve actuator mechanism 188 may be connected to the outlet valve 196 and configured to actuate the outlet valve 196. The outlet valve 196 may be connected to the inlet opening 136 at one side and the outlet opening 166 at the other side through the conduit channel 164 and configured to outlet water supplied from the inlet opening 136 through the outlet opening 166 if needed.

Figure 5A:
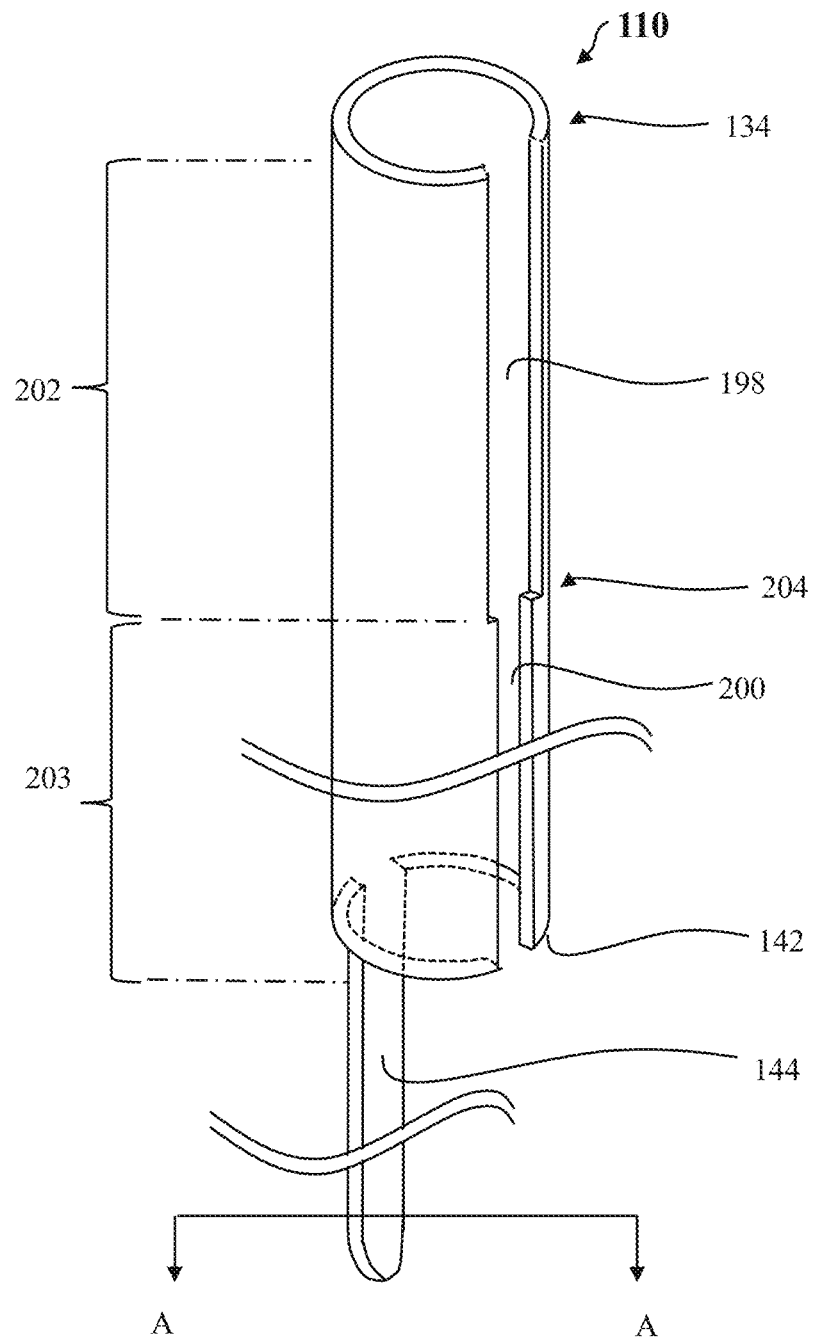
FIGS. 5A to 5C depict the various views of a watering pipe of the irrigation device of the subterranean irrigation system illustrated in FIGS. 1 to 4E in accordance with one or more embodiments.
Figure 5B:
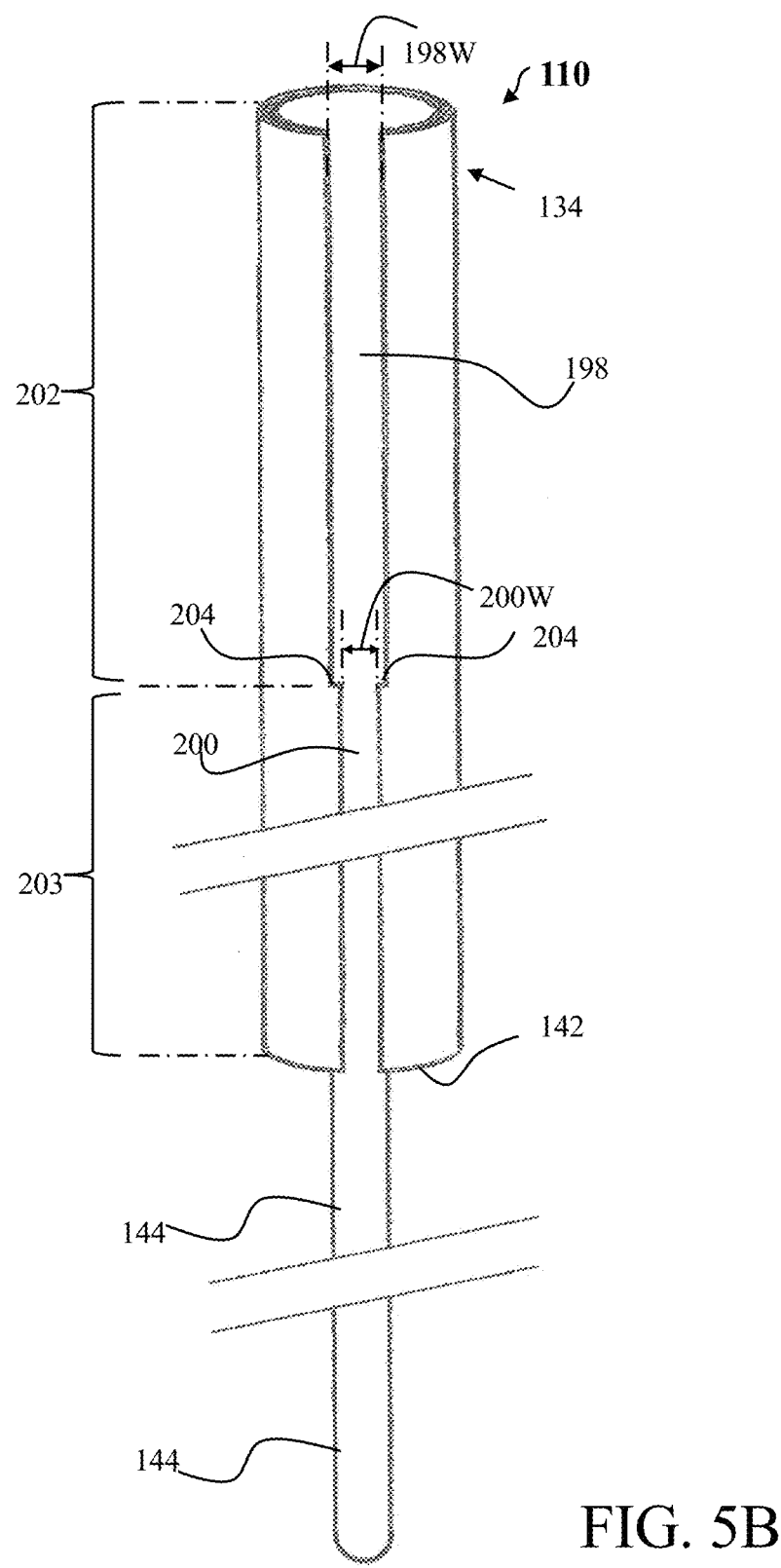
Figure 5C:
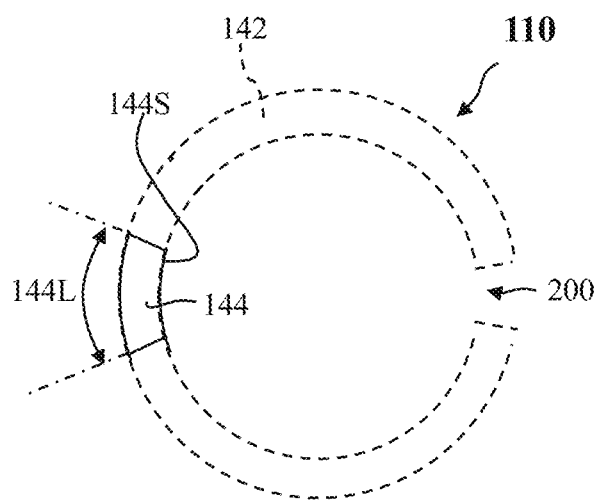
Figure 5E:
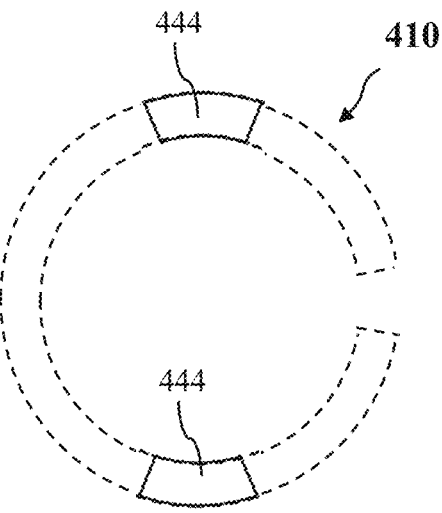
FIGS. 5D to 5F depict various embodiments of a watering pipe of the irrigation device of the subterranean irrigation system illustrated in FIGS. 1 to 4E in accordance with one or more embodiments.
Figure 5D:
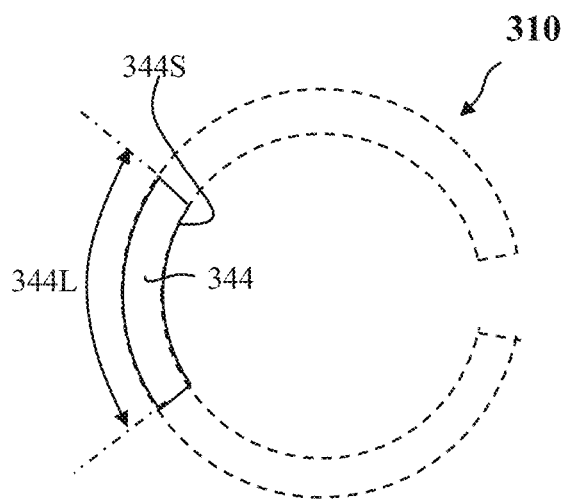
Figure 5F:
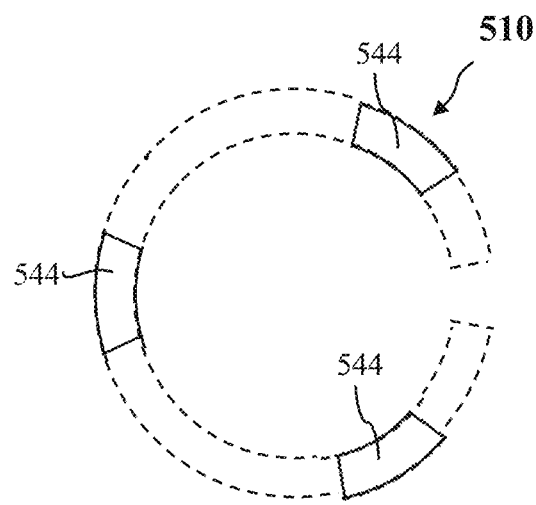

FIGS. 5A to 5F are a non-limiting, exemplary illustration of a watering pipe of the irrigation device of the subterranean irrigation system illustrated in FIGS. 1 to 4E in accordance with one or more embodiments of the present invention. FIG. 5A depicts a top perspective view of the watering pipe 110, FIG. 5B depicts a front view of the watering pipe 110, and FIG. 5C depicts a cross section view of the watering pipe 110 viewed along line A-A shown in FIG. 5A. FIGS. 5D to 5F depict various embodiments of the watering pipes.

As illustrated in FIGS. 1 to 5C, the watering pipe 110 may have an elongated hollow cylindrical configuration with a first longitudinally extending slot 198 and a second longitudinally extending slot 200 extended from one end of the first longitudinally extending slot 198. In a longitudinal direction of the watering pipe 110, the first longitudinally extending slot 198 may be formed along an upper portion 202 of the watering pipe 110 and configured to mate with and housed in the watering pipe housing 156 of the control box 108. The second longitudinally extending slot 200 may be formed along a lower portion 203 of the watering pipe 110 and positioned outside of the watering pipe housing 156 of the control box 108. In a circumference direction of the watering pipe 110, the width 198W of the first longitudinally extending slot 198 may be larger than width 200W of the second longitudinally extending slot 200 (See FIG. 5B). In some embodiments, the watering pipe 110 may be made of PVC or similar material but is not limited thereto.

The second longitudinally extending slot 200 may be a continuation of the first longitudinally extending slot 198, but with narrower opening, which defines dividing edges 204 between the first longitudinally extending slot 198 and the second longitudinally extending slot 200. The watering pipe 110 may be inserted into the watering pipe housing 156 while the first longitudinally extending slot 198 of the watering pipe 110 receives or engages with the protruding portion 157 of the watering pipe housing 156. In this structure, the dividing edges 204 between the first longitudinally extending slot 198 and the second longitudinally extending slot 200 may function as "stops" upon which the protruding portion 157 of the watering pipe housing 156 sits and thus the bottom side 162 of the control box 108 rests. Accordingly, while the first longitudinally extending slot 198 is engaged with the longitudinally extending protruding portion 157 inside the watering pipe housing 156, the second longitudinally extending slot 200 may be positioned below the longitudinally extending protruding portion 157. In this structure, the probe housing 158, which is positioned inside the longitudinally extending protruding portion 157, may be aligned with the second longitudinally extending slot 200 and may form a long channel for the probe 122. That is, a top distal end 160 of the probe 122 may be inserted within the probe housing 158, which is positioned inside the longitudinally extending protruding portion 157, and a top section of the probe 122 may be embedded within the second longitudinally extending slot 200.

As further illustrated, the watering pipe 110 may include at least one projection 144 that linearly extends longitudinally from a bottom distal end opening 142 of the watering pipe 110 and is configured to support an excavated hole of the ground. Referring to FIG. 5C, one or more projection 144 may comprise a curved cross-sectional profile with a concaved surface 144S. The one or more projection 144 may function as a supporting brace wall that supports the wall of the excavated hole and prevents its full collapse, thus allowing for a formation of an "air-pocket" for aeration and free flow of water. In some embodiments, the watering pipe 110 may include a plurality of projections 144. The number of projections 144, the arc length 144L of the projection 144 in its circumference direction, and/or the longitudinal height of the projection 144 may vary depending on types of soil materials (e.g. sandy, clay, silty, and loam percentages) that the watering pipe 110 of the irrigation device is installed. The projection 144 designed based on the types of soil materials may be beneficial for creating a stable air pocket, which is critical for proper water absorption and aeration of soil, thereby promoting beneficial aerobic microbiological growth. The diameter of air pocket formed by the projection 114 may be the same as that of the watering pipe 110 and may be adjusted as needed.

In some embodiments, referring to FIG. 5D, a projection 344 of a watering pipe 310 may be adjusted to have a greater arc length 344L than that of the watering pipe 110. Accordingly, a concaved surface 344S of the watering pipe 310 may also expand, making it easier to form an air pocket. In other embodiments, referring to FIGS. 5E and 5F, a watering pipe may have a plurality of projections. For example, a watering pipe 410 may have two projections 444, and another watering pipe 510 may have three projections 544. However, the present disclosure is not limited thereto. The number and/or arrangements of a plurality of projections may be selected based on types of soil materials as described above.

Figure 6A:
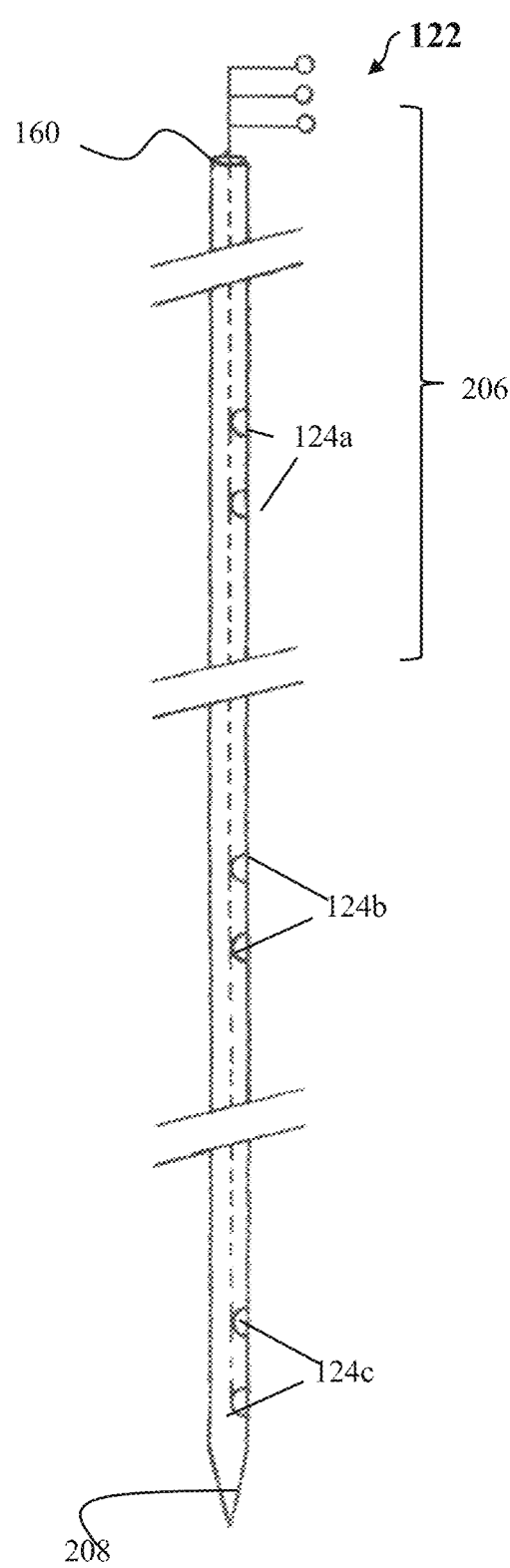
FIGS. 6A and 6B depict probe of the irrigation device of the subterranean irrigation system illustrated in FIGS. 1 to 5B in accordance with one or more embodiments.
Figure 6B:
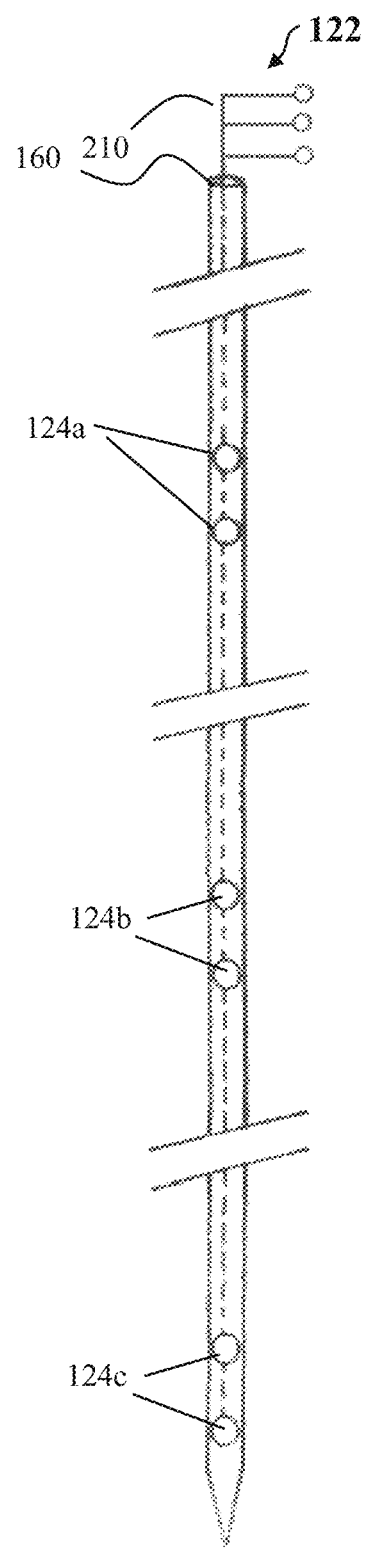

FIGS. 6A and 6B are non-limiting, exemplary illustrations of probe of the irrigation device of the subterranean irrigation system illustrated in FIGS. 1 to 5B in accordance with one or more embodiments of the present invention. FIG. 6A depicts a side view of the probe 122, and FIG. 6B depicts a front view of the probe 122.

As illustrated, the probe 122 may include an elongated rigid, but hollow piece with a top distal end 160 housed in the probe housing 158 of the control box 108 and a bottom distal end 208 inserted into ground. A top section 206 of the probe 122 may be embedded within the second longitudinally extending slot 200 of the watering pipe 110.

The probe 122 may comprise one or more embedded sensors 124a, 124b, 124c. In particular, the probe 122 may include a first moisture sensor 124a at a top section 206 of the probe 122, a second moisture sensor 124b positioned below the first moisture sensor 124a, and a third moisture sensor 124c near the bottom distal end 208 of the probe 122. As best shown in FIG. 6B, a wire-harness 210 from the sensors 124a, 124b, 124c may be egressing from the top distal end 160 of probe 122 and communicatively associated with the MCU 178 within the control box 108. It should be noted that the orientation of the first moisture sensor 124a embedded within the second longitudinally extending slot 200 of the watering pipe 110 may face outward from watering chamber and is not exposed to water inside of the watering pipe 110.

Figure 7:
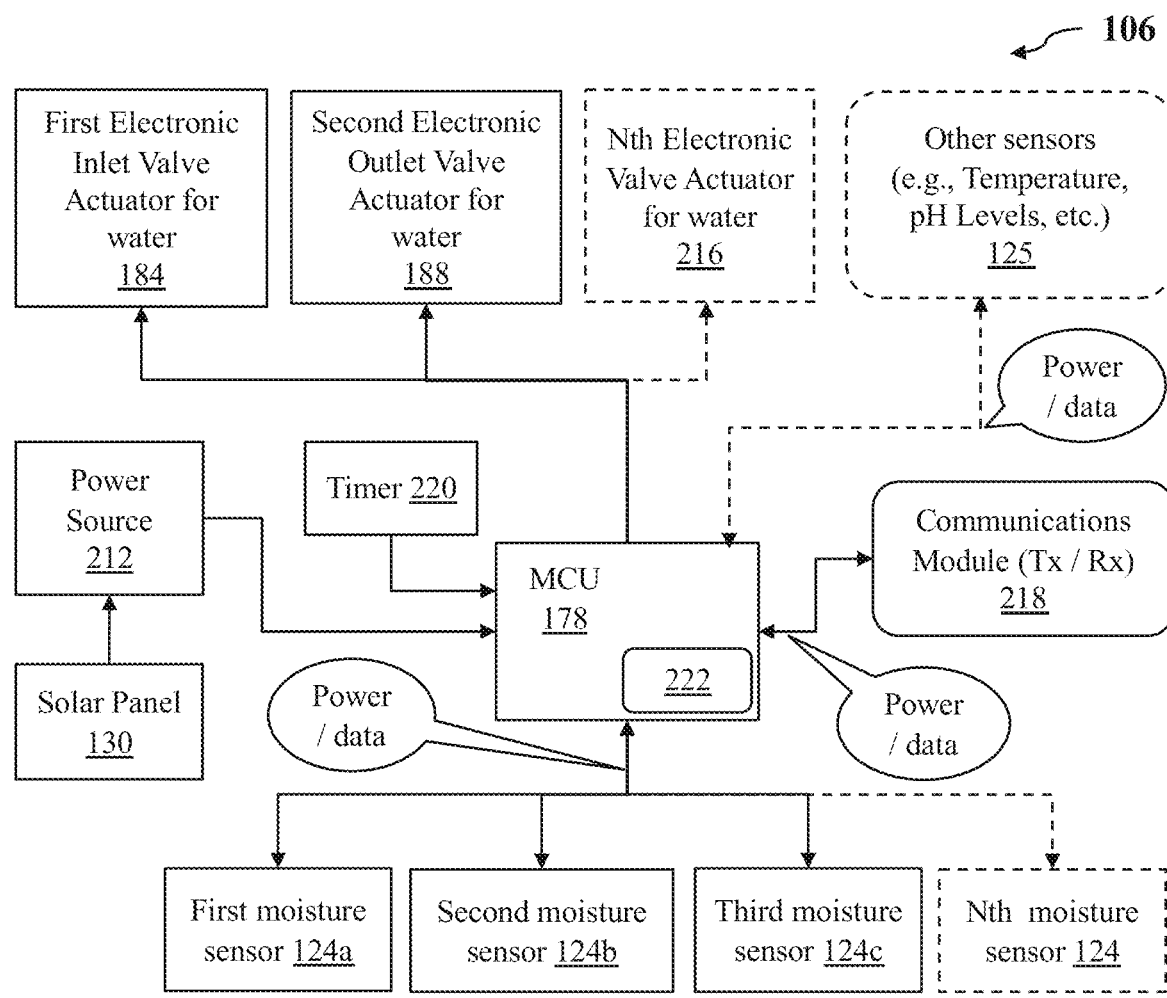
FIG. 7 depicts a microcontroller unit (MCU) and schematic circuitry of various other electrical/electronic components and bus/wiring system of the irrigation device of the subterranean irrigation system illustrated in FIGS. 1 to 5B in accordance with one or more embodiments.

FIG. 7 is a non-limiting, exemplary illustrations of an electrical controller circuitry including a microcontroller unit (MCU) and schematic circuitry of various other electrical/electronic components and bus/wiring system of the irrigation device of the subterranean irrigation system illustrated in FIGS. 1 to 6B in accordance with one or more embodiments of the present invention.

As illustrated in FIGS. 1 to 7, the electrical control circuitry 106 of the irrigation device 102 may include a connectivity bus/wiring between a solar panel 130 and a power source 212, which may include a battery (174, FIG. 4D) and other conventional circuitry for charging of the battery (174, FIG. 4D).

The generated power source from the battery (174, FIG. 4D) may be used to power all electrical components, including microcontroller unit (MCU) 178 that may include an internal memory 222.

As illustrated, one or more sensors 124a, 124b, 124c, 124 may further be associated with the MCU 178, including a first moisture sensor 124a, a second moisture sensor 124b, and a third moisture sensor 124c, which may be installed at different positions of the irrigation device 102. As illustrated, other moisture sensors 124 may be communicatively associated with the MCU 178, if needed. In addition, one or more actuators may further be associated with the MCU 178, including a first electrical inlet valve actuator 184 and a second electrical outlet valve actuator 188 for opening and closing inlet and outlet valves 192 and 196, respectively. As illustrated, other electrical valve actuators 216 may be communicatively associated with the MCU 178, if need be.

The MCU 178 may further includes power and data communication connectors for allowing power and data communications via a bus system. Power and data communications may be transmitted via a bus system to and from the MCU 178 to one or more of electrical inlet/outlet valves, sensors, a communications module 218, power charging circuitry, a timer 220, etc. The communications module 218 may include a communications module interface.

The timer 220 may be used to program time/duration of water flow. The communications module 218 may be used to receive and transmit information and/or data from various devices, including, but not limited to, external computing devices such as Cloud based Computing Systems, servers, other client devices such as handheld devices, or other external servers, and so on, including any external computers connected to a network and or Internet connection, or any computer readable medium, etc. One or more embodiments of the present invention may function with only a timer, a power source, a water valve, and a watering pipe with a brace(s).

The communication module 218 may include a wireless or wired transceiver Tx/Rx for implementing desired communications protocols via desired network. Other conventional electronic components (e.g., memory/storage modules such as Random Access Memory, Hard drive, etc.) may also exist but are not shown for simplicity. Data communicated by the communication module 218 may include volume of water consumption, water pressure to unit, length of time that valves are opened and closed, air temperature, ground temperature on surface and subsurface, water temperature PH levels, battery level and health, etc.

Figure 8:
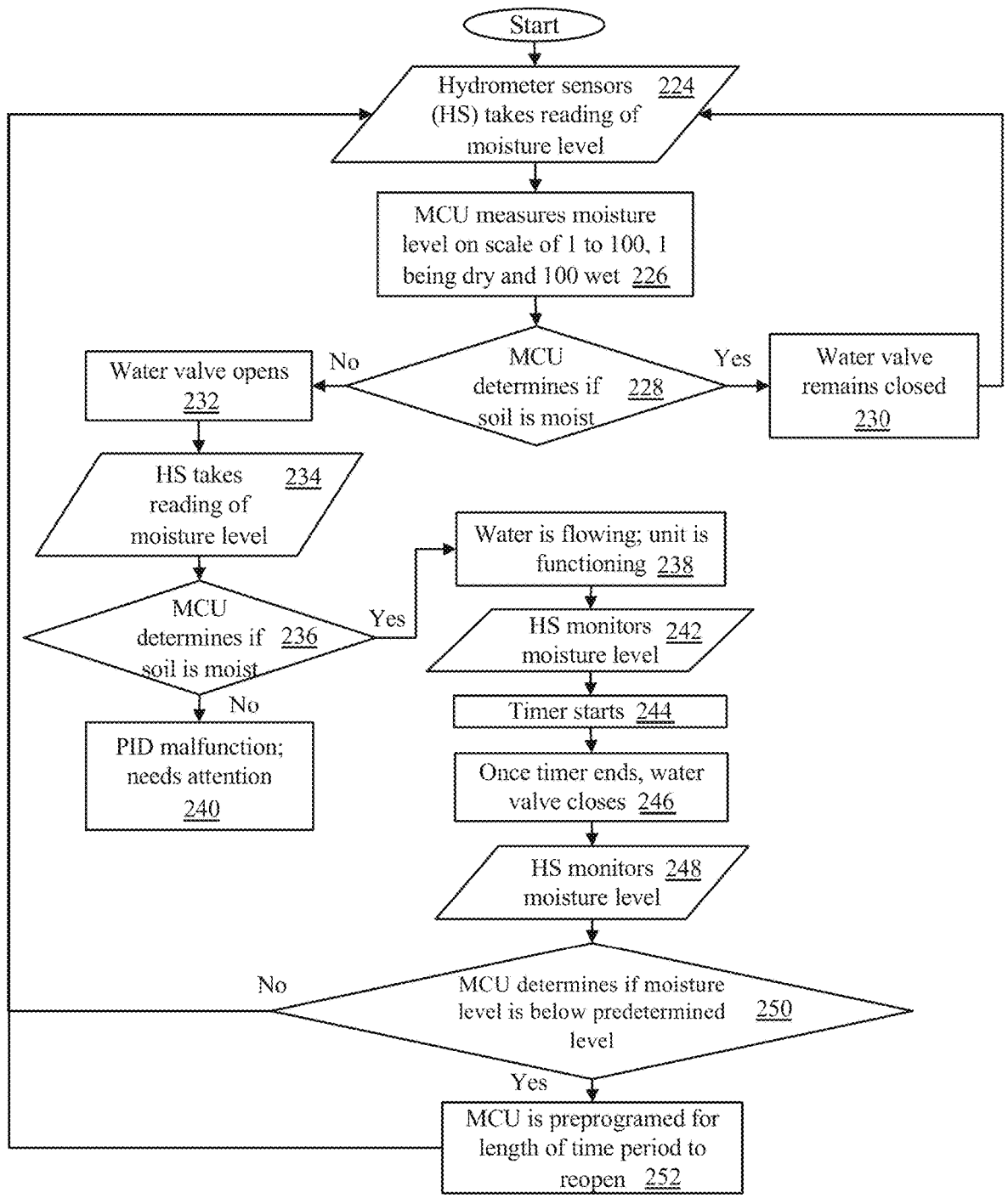
FIG. 8 depicts a flow diagram of operations of the irrigation device of the subterranean irrigation system illustrated in FIGS. 1 to 7 in accordance with one or more embodiments.

FIG. 8 is a non-limiting, exemplary illustrations of flow diagram of operations of the irrigation device of the subterranean irrigation system illustrated in FIGS. 1 to 7 in accordance with one or more embodiments of the present invention.

As illustrated in FIGS. 7 and 8, an MCU 178 may receive and read data from at least one of sensors 124a, 124b, 124c, 124 related to moisture (step 224), and then measure a moisture level on scale of 1 to 100, 1 being dry and 100 wet (step 226). Based on predefined parameters related to the moisture level, the MCU 178 may determine if soil is moist (step 228).

If the MCU 178 determines that soil is moist, or the moisture level is at or beyond a predetermined level, at the step 228, then the MCU 178 may transmit a signal to inlet valves to close to shut-off water and water valve remains closed (step 230). If the MCU 178 determines that soil is not moist, or the moisture level is below the predetermined level, then the MCU 178 may transmit a signal to inlet valves to open and allow water flow (step 232).

After the water valve opens, the MCU 178 may continue to receive and read data from at least one of sensors 124a, 124b, 124c, 124 (step 234) and determines if soil is moist (step 236). If the MCU 178 determines that soil is moist at the step 236, then the MCU 178 may transmit a signal to external devices via communications module 218 that the system is operational and water is flowing (step 238). If the MCU 178 determines that soil is not moist at the step 236, then the MCU 178 may transmit a malfunctioning signal to external devices (step 240).

If the MCU 178 determines that the system is operational and water is flowing, it may continue to receive data from sensors 124a, 124b, 124c, 124 (step 242) and commence timer operations of timer 220 (step 244). Once time is expired, the MCU 178 transmits a shut-off signal to the inlet valve 184 to shut-off water (step 246).

Then, the MCU 178 may continue to receive data from sensors 124a, 124b, 124c, 124. If moisture level is determined to be zero, or below a predetermined level, (step 250), then the MCU 178 is preprogrammed to open the inlet valve 184 for length of time period (step 252).

Figure 9A:
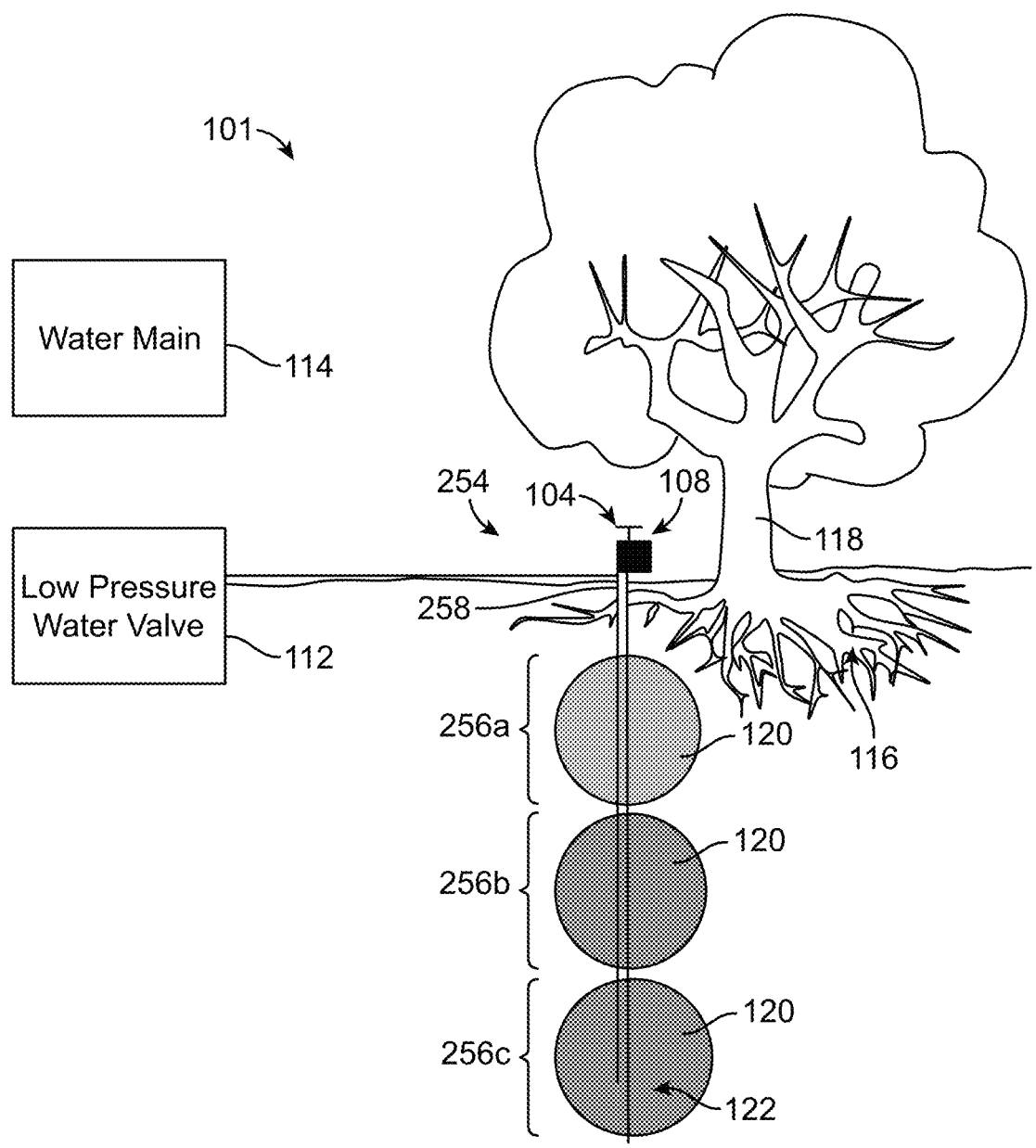
FIGS. 9A to 9C depict an irrigation device in accordance with another embodiment.
Figure 9B:
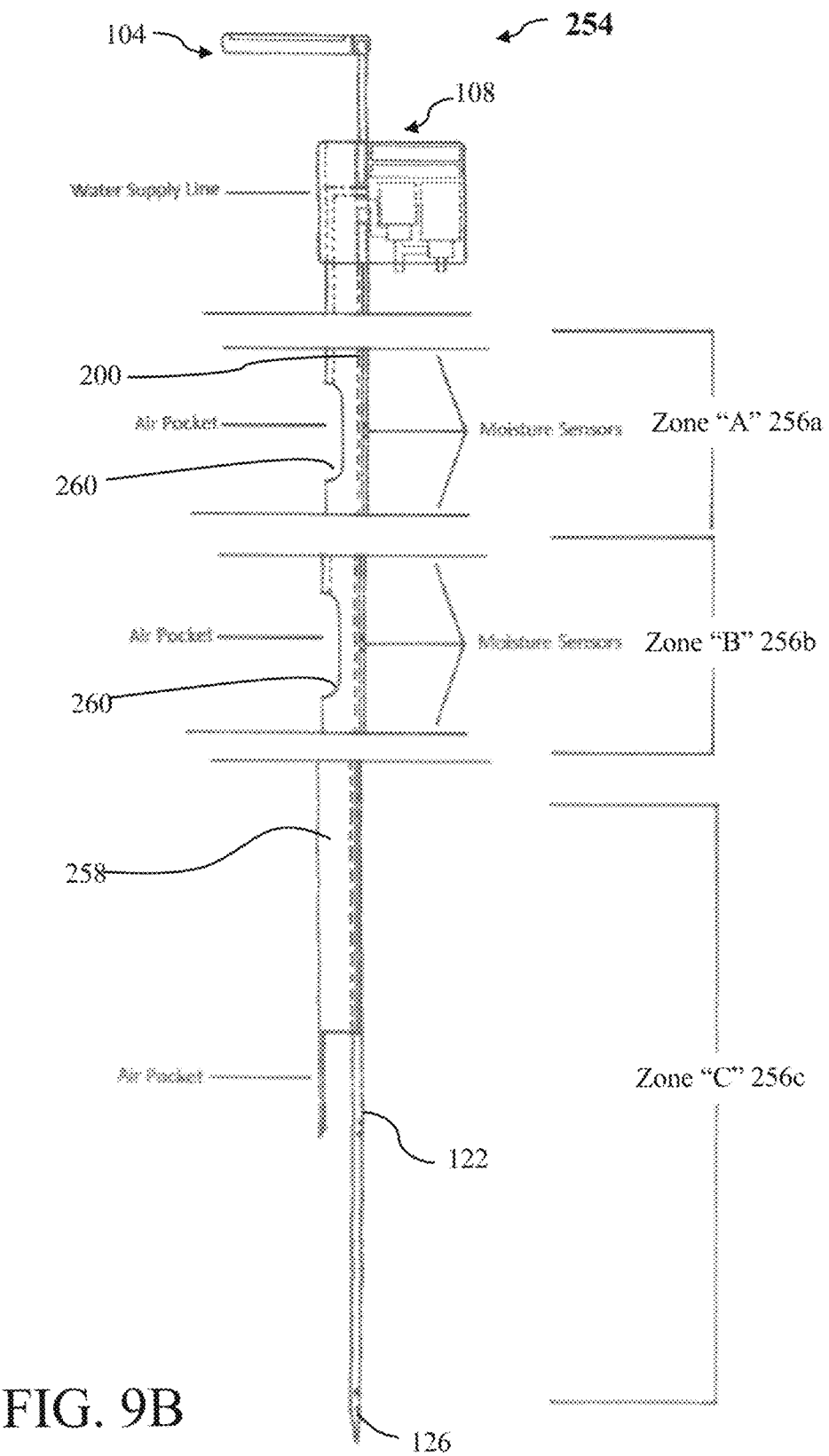
Figure 9C:
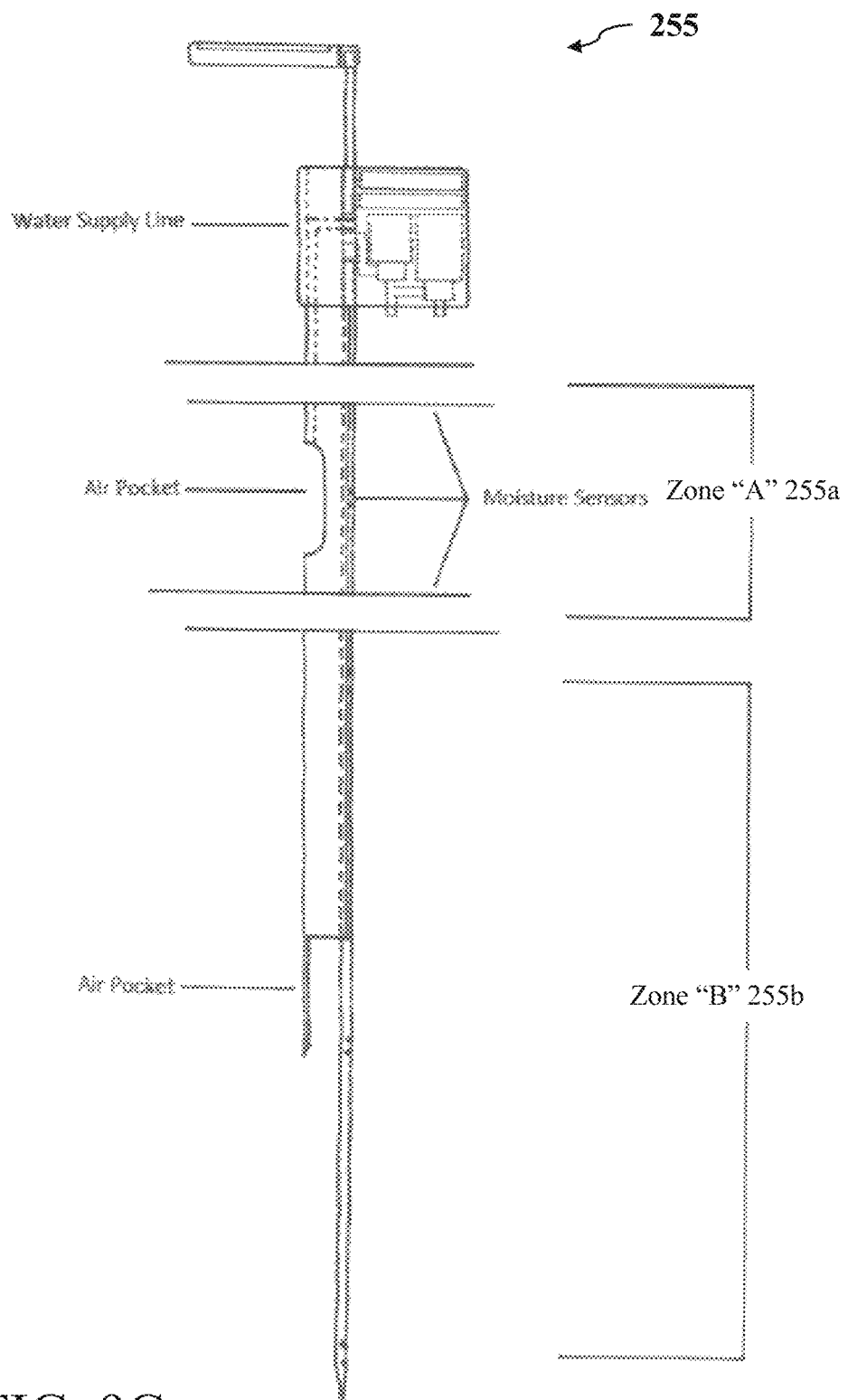

FIGS. 9A and 9B are non-limiting, exemplary illustrations of an irrigation device in accordance with another embodiment of the present invention. FIG. 9C is a non-limiting, exemplary illustration of an irrigation device in accordance with another embodiment of the present invention. The irrigation device 254 illustrated in FIGS. 9A and 9B and irrigation device 255 illustrated in FIG. 9C may include similar corresponding or equivalent components, methods, interconnections, functional, operational, and or cooperative relationships as the irrigation device 102 that is shown in FIGS. 1 to 8 and described above. Therefore, for the sake of brevity, clarity, convenience, and to avoid duplication, the general description of FIGS. 9A to 9C will not repeat every corresponding or equivalent component, methods, interconnections, functional, operational, and or cooperative relationships that has already been described above in relation to the irrigation device 102 that is shown in FIGS. 1 to 8 but instead, are incorporated by reference herein.

As illustrated in FIGS. 9A and 9B, unlike the embodiment illustrated in FIGS. 1 to 8 where only a single zone was shown, the irrigation device 254 may comprise multiple zones 256a, 256b, 256c with each zone operating similar to the single zone shown in FIG. 1. FIGS. 9A and 9B illustrate that the irrigation device 254 has three zones but is not limited thereto. FIG. 9C illustrates a two-zone irrigation device 255, with first and second zones 255a and 255b. To supply water to these plurality of zones, a plurality of inlet valves corresponding to the multiple zones may be installed on the control box 608.

The irrigation device 254 shown in FIGS. 9A and 9B may include a watering pipe 258 and upper water egressing openings 260. The upper water egressing opening 260 may be an elongated opening at a side of the watering pipe 258, positioned below, but at an opposite side of the second longitudinally extending slot 200. The added upper water egressing opening 260 may allow for an "air pocket" for aeration of the soil, similar to the combination of the distal end opening (142, FIGS. 2A and 2B) and projection (144, FIGS. 2A and 2B).

FIGS. 10A to 10E are non-limiting, exemplary illustrations of a subterranean irrigation system and irrigation device in accordance with another embodiment of the present invention. The subterranean irrigation system 262 illustrated in FIGS. 10A to 10C may include similar corresponding or equivalent components, methods, interconnections, functional, operational, and or cooperative relationships as the subterranean irrigation system 100 that is shown in FIGS. 1 to 9C and described above. Therefore, for the sake of brevity, clarity, convenience, and to avoid duplication, the general description of FIGS. 10A to 10E will not repeat every corresponding or equivalent component, methods, interconnections, functional, operational, and or cooperative relationships that has already been described above in relation to subterranean irrigation system 100 that is shown in FIGS. 1 to 9C but instead, are incorporated by reference herein.

As illustrated in FIGS. 10A to 10E, the subterranean irrigation system 262 may be used to deliver water to a plurality of distributed plants. The subterranean irrigation system 262 may comprise an irrigation device 263 having a primary watering pipe for delivery of water. In some embodiments, the irrigation device 263 may be the irrigation device 102 having the watering pipe 110 as shown in FIGS. 1 to 8 or the irrigation devices 254, 255 having the watering pipe 110 as shown in FIGS. 9A to 9C. The irrigation device 263 may further include a probe (122, FIGS. 1 to 9B) that is physically connected to the watering pipe and has at least one sensor.

Further included in the subterranean irrigation system 262 may be one or more downstream secondary watering pipes 264 for delivery of water from the irrigation device 263 to other distributed locations. The primary watering pipe of the irrigation device 263 and the secondary watering pipe 264 may be connected in series via a series plumbing circuitry 270. The secondary watering pipes 264 may also be connected in series via a series plumbing circuitry 270.

Figure 10A:
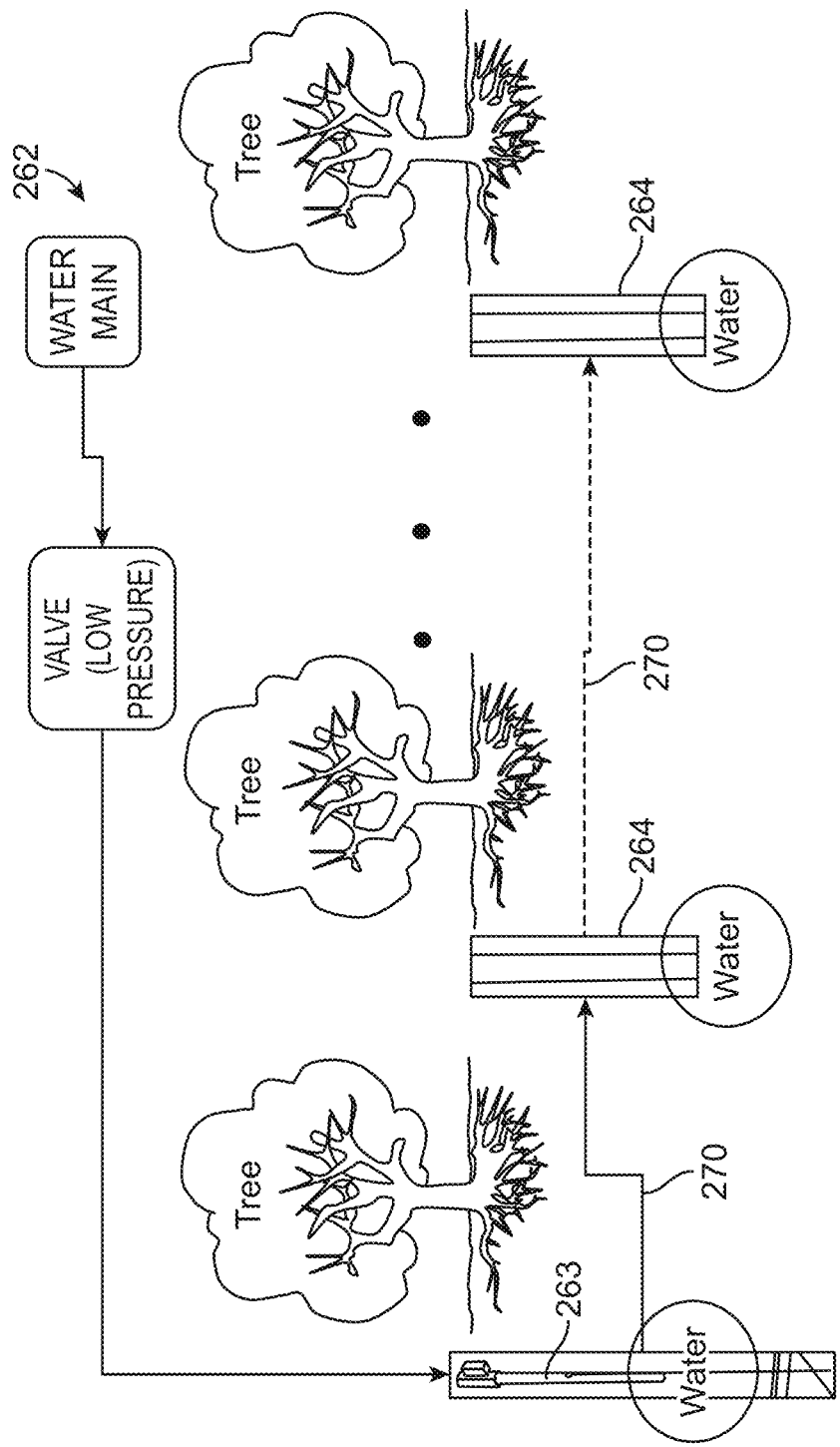
FIGS. 10A to 10E depict a subterranean irrigation system and irrigation device in accordance with another embodiment.
Figure 10B:
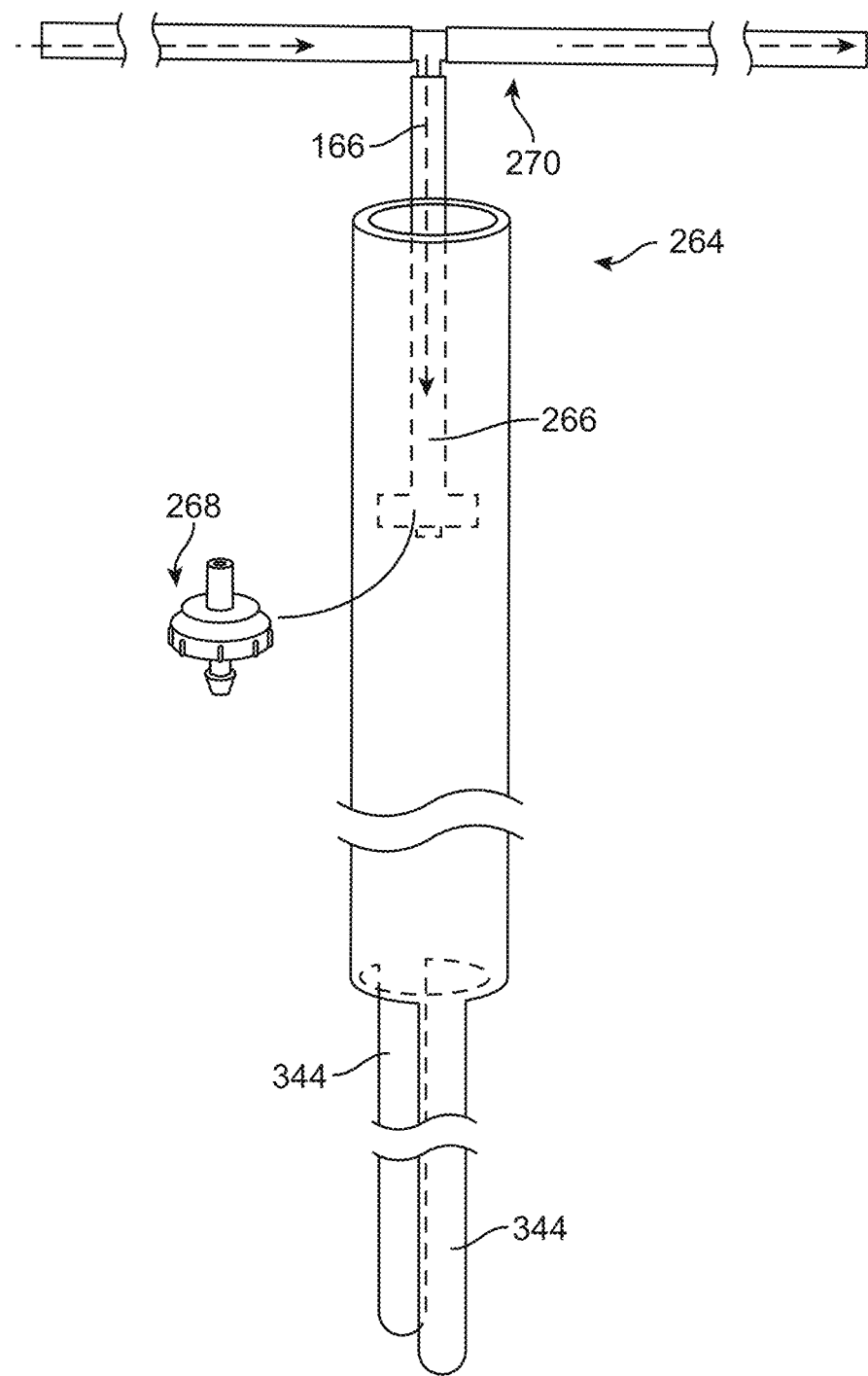

As best illustrated in FIG. 10B, the secondary watering pipes 264 may be connected in series via the series plumbing circuitry 270 with a downtube portion 266 that houses a dripper unit (button drip emitter) 268. The dripper unit 268 may be calibrated to match the same setting as the water main (114, FIG. 1). The secondary watering pipes 264 may receive water from the outlet opening of the control box of the irrigation device 263. The outlet opening of the control box of the irrigation device 263 may be an outlet opening (138, FIGS. 2A and 2B) of the control box (108, FIGS. 2A and 2B) in the irrigation device 102 shown in FIGS. 2A and 2B. In this non-limiting, exemplary instance, the downstream or secondary watering pipes 264 may include dual projections 344 ensuring creation of an "air pocket" within an excavated hole for aeration.

Figure 10C:
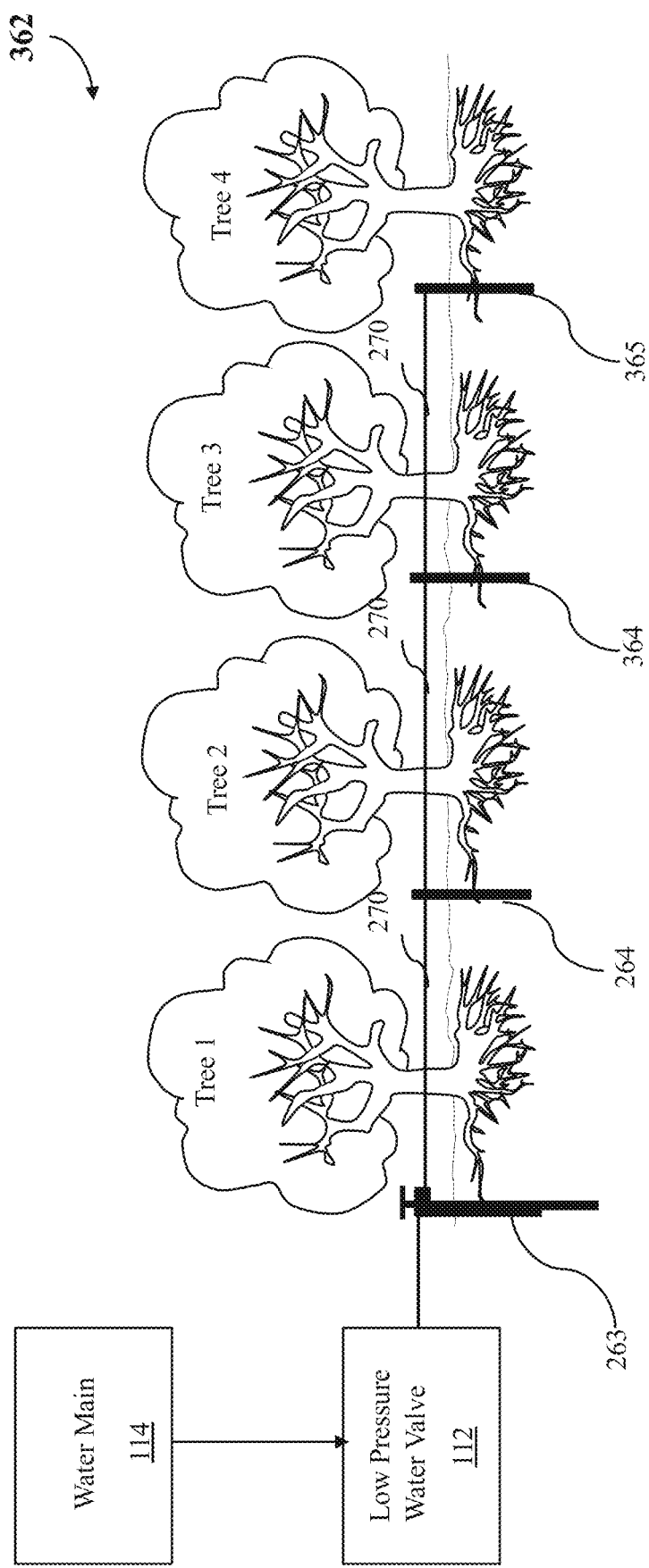

There are many numbers of permutations and combinations of connectivity or plumbing circuitry that may be arranged between the single irrigation device 263 and the downstream or secondary watering pipes 264 for a subterranean irrigation system, including series, daisy, parallel, etc. Referring to FIG. 10C, a subterranean irrigation system 362 may include one irrigation device 263 and three or more secondary watering pipes 264, 364, 365 connected to the irrigation device 263 in series via the series plumbing circuitry 270. The irrigation device 263 and three or more secondary watering pipes 264, 364, 365 may be respectively installed at positions of Trees 1 to 4. The irrigation device 263 may receive water from the water main through a low pressure water valve, supply water to Tree 1, and also deliver the received water to the next secondary watering pipes 264, 364, 365 through the plumbing circuitry 270. The delivered water from the irrigation device 263 may be delivered to the three or more secondary watering pipes 264, 364, 365 in series, and each of the secondary watering pipes 264 may supply water to Tree 2 to 4, respectively. In some embodiments, the irrigation device 263 may be the irrigation device 102 as shown in FIGS. 1 to 8 or the irrigation device 254, 255 as shown in FIGS. 9A to 9C. The irrigation device 263 may further include a probe (122, FIGS. 1 to 9B) that is physically connected to the watering pipe (110, FIGS. 1 to 9B) and has at least one sensor. In some embodiments, the three or more secondary watering pipes 264, 364, 365 may have the same structure. In other embodiments, the three or more secondary watering pipes 264, 364, 365 may have different structures depending on the watering requirements of the Tree 2, Tree 3, and Tree 4.

Figure 10D:
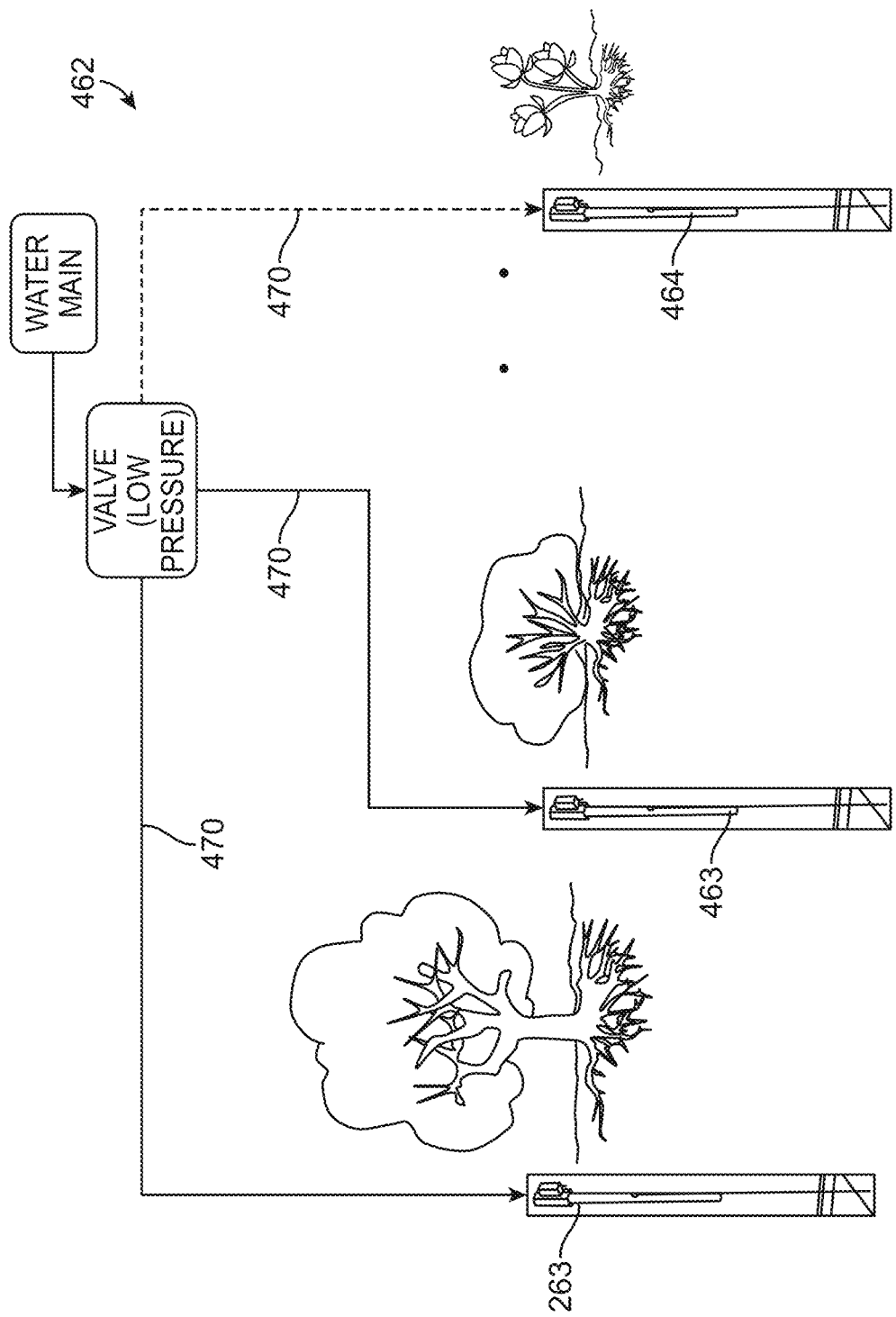
Figure 10E:
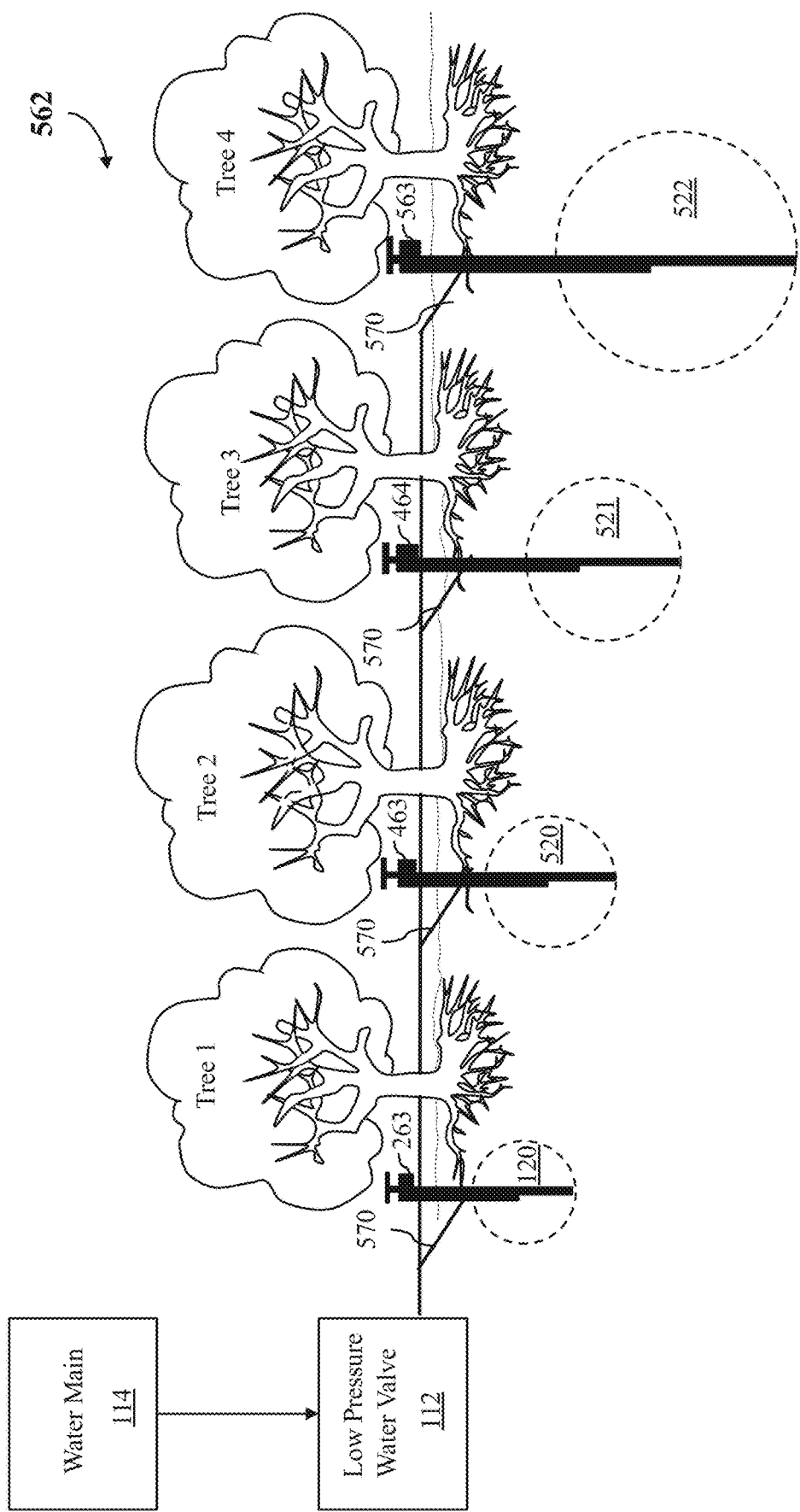

Further, and as best illustrated in FIGS. 10D and 10E, there are many numbers of permutations and combinations of connectivity or plumbing circuitry that may be arranged between multiple irrigation devices for a subterranean irrigation system, including series, daisy, parallel, etc. As a specific example, FIG. 10D illustrates a subterranean irrigation system 462 that includes multiple irrigation devices 263, 463, 464 connected to each other in parallel through a parallel plumbing circuitry 470. In some embodiments, the multiple irrigation devices 263, 463, 464 may have different operation conditions. That is, the "parallel" circuitry of the multiple irrigation devices 263, 463, 464 may be applied where each type of plant (tree, shrub, flower) requires different watering properties (or parameters). In another example, referring to FIG. 10E, a subterranean irrigation system 562 may include four or more irrigation devices 263, 463, 464, 563 connected to each other in parallel through a parallel plumbing circuitry 570. The four or more irrigation devices 263, 463, 464, 563 may be respectively installed at positions of Trees 1 to 4. In this case, each of the irrigation devices 263, 463, 464 may have different structures and/or operation conditions depending on the watering requirements of the Trees 1 to 4. Accordingly, as shown in FIG. 10E, each spherical underground "reservoir" 120, 520, 521, 522 formed by water supply from each irrigation devices 263, 463, 464, 563 may be different from each other.

Figure 11A:
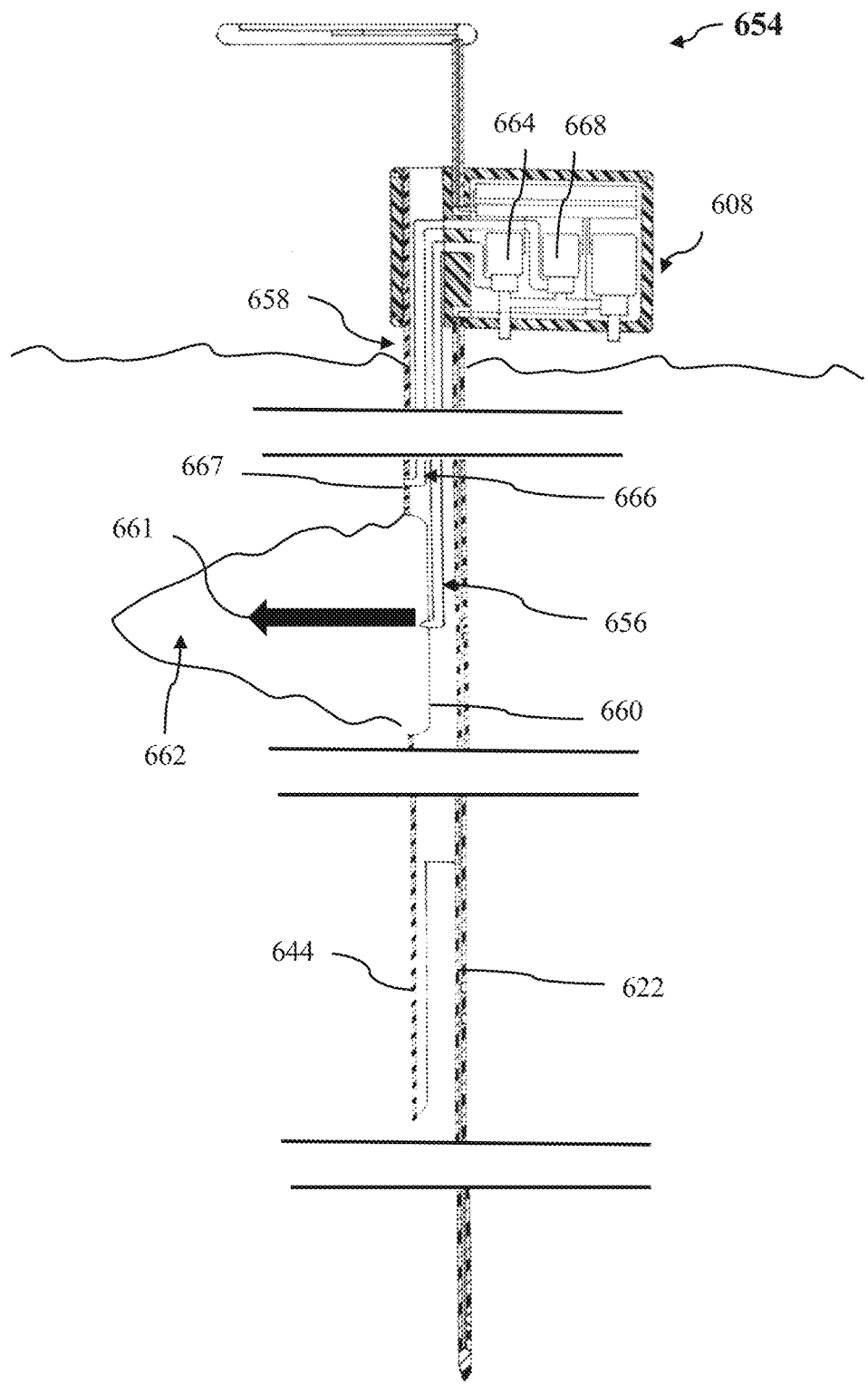
FIGS. 11A to 11E depict an irrigation device of a subterranean irrigation system and a water jet mechanism installed on the irrigation device in accordance with another embodiment.
Figure 11B:
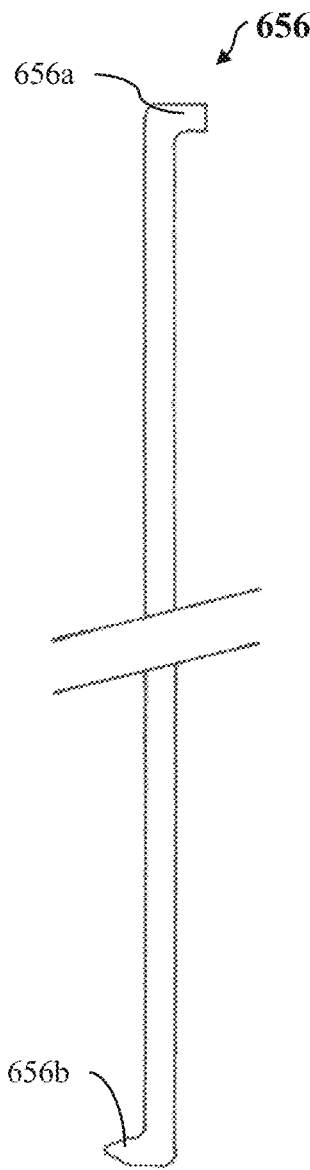
Figure 11C:
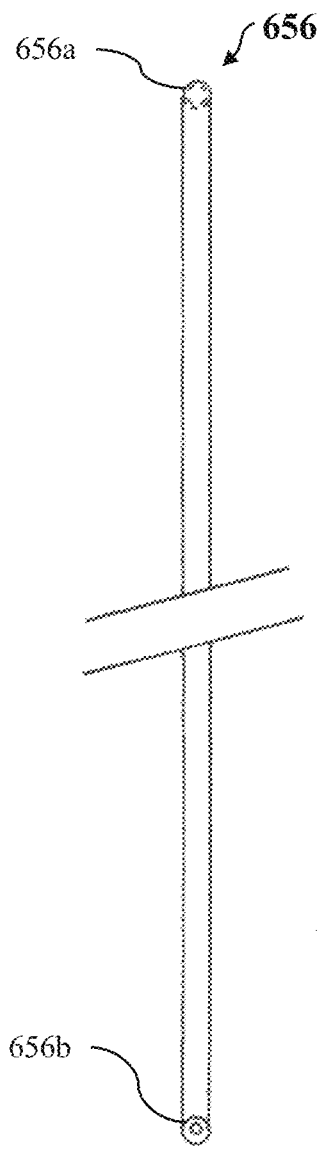
Figures 11D, 11E:
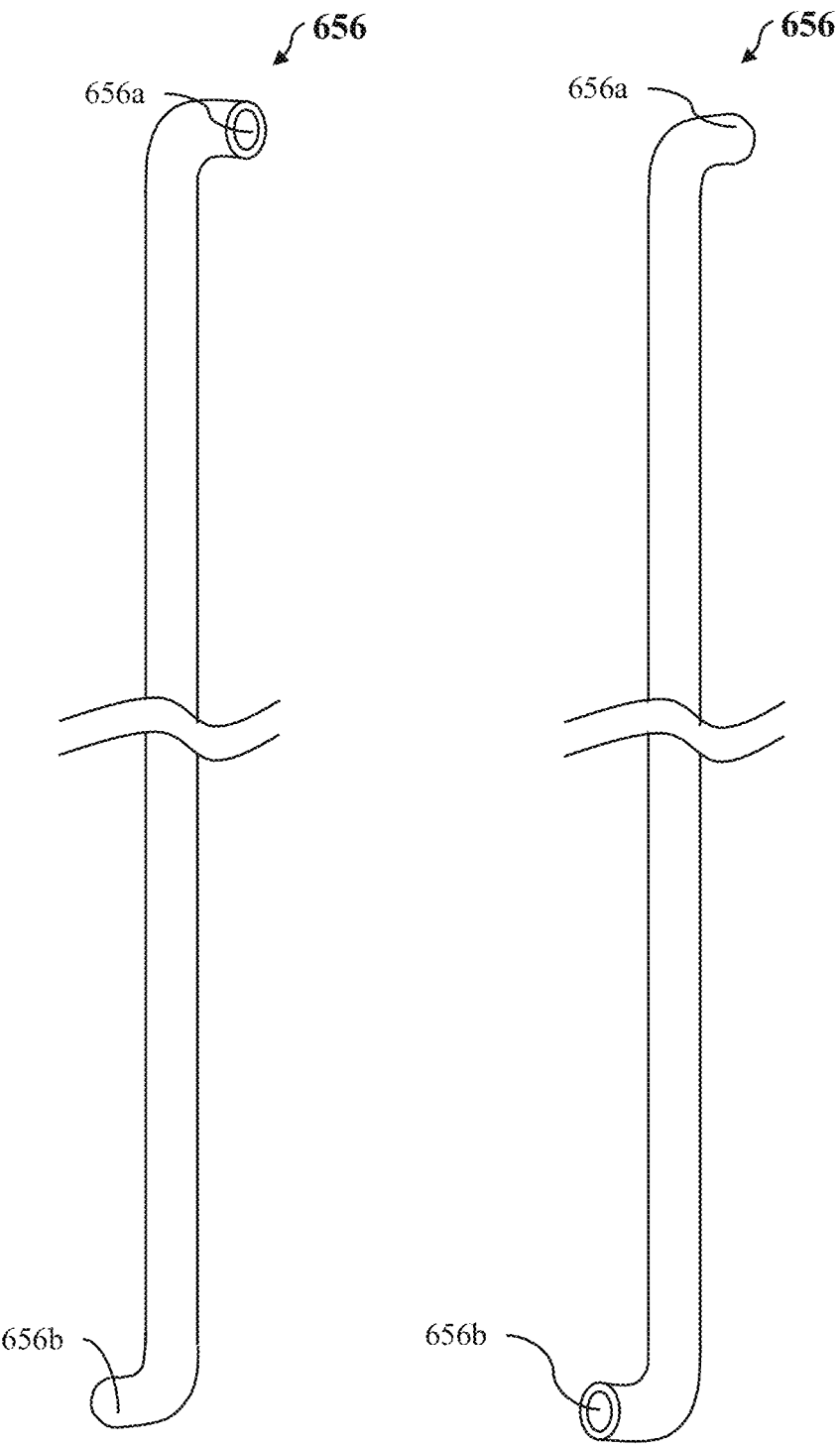

FIGS. 11A to 11E are non-limiting, exemplary illustrations of a subterranean irrigation system and an irrigation device in accordance with another embodiment of the present invention. FIG. 11A depicts an irrigation device 654 including a water jet mechanism 656, FIG. 11B depicts a side view of the water jet mechanism 656, FIG. 11C depicts a front view of the water jet mechanism 656, FIG. 11D depicts a front perspective view of the water jet mechanism 656, and FIG. 11E depicts a rear perspective view of the water jet mechanism 656. The subterranean irrigation system illustrated in FIGS. 11A to 11E includes similar corresponding or equivalent components, methods, interconnections, functional, operational, and or cooperative relationships as subterranean irrigation systems that are shown in FIGS. 1 to 10E and described above. Therefore, for the sake of brevity, clarity, convenience, and to avoid duplication, the general description of FIGS. 11A to 1E will not repeat every corresponding or equivalent component, methods, interconnections, functional, operational, and or cooperative relationships that has already been described above in relation to subterranean irrigation systems that are shown in FIGS. 1 to 10E but instead, are incorporated by reference herein.

In this embodiment, a subterranean irrigation system may include an irrigation device 654 having a water jet mechanism 656. Specifically, the irrigation device 654 may include a watering pipe 658 that is connected to a control box 608 and has one or more upper water egressing openings 660 formed at a side of the watering pipe 658. The upper water egressing opening 660 may be an elongated opening that allows for an "air pocket" 662 for aeration of the soil. The water jet mechanism 656 may be extended from the inside of the control box 608 toward the water egressing opening 660 through the watering pipe 658. One end 656a of the water jet mechanism 656 may be inserted into an opening 180 inside the control box 108 where a conduit channel 164 supplying water from an inlet opening 136 is connected, and the other end 656b of the water jet mechanism 656 may be exposed through the water egressing opening 660 and configured to form the air pocket 662 by water jet. Specifically, the other end 656b of the water jet mechanism 656 may be used to egress water flow formed with low pressure (e.g. 25 psi) from an inlet valve 664. The water jet mechanism 656 may also be used to clear any potential debris.

When the inlet valve 664 for the water jet mechanism 656 is fully opened to use a nozzle as water jet, air pocket may be excavated under the ground. In this case, the displaced debris may fall through the watering pipe 658 into the enlarged air pocket, which may have a greater depth. When the inlet valve 664 is partially opened, the nozzle may drip water at the desired rate. The water jet mechanism 656 may be positioned near a water supply mechanism 666 inside the watering pipe 658. The weep hole 667 of the water supply mechanism 666 may be located near the upper water egressing openings 660 and configured to supply water to the underground zone via an inlet valve 668. In some embodiments, referring to FIG. 9B with FIG. 10B, the watering pipe 658 of the irrigation device 654 may have a plurality of upper water egressing openings 260 as shown in FIG. 9B. The air pockets formed near the upper water egressing openings 260 may be formed by a plurality of water jet mechanism 656 but are not limited thereto. In some embodiments, these upper water egressing openings 260 may be manually excavated with hose and/or nozzle. To supply water to a plurality of zones through the upper water egressing openings 260, a plurality of inlet valves may be installed on the control box 608.

In some embodiments, a subterranean irrigation system may include one or more irrigation devices 654 configured to deliver water to below a ground surface. Each of the one or more irrigation devices 654 may include a watering pipe 658 configured to be inserted into the ground and including at least one egressing opening 660 formed at a side of the watering pipe 658 and the water jet mechanism (656) configured to form an air pocket 662 into the ground in front of the at least one egressing opening 660. Each of the one or more irrigation devices 654 may further include a probe 622 extended along the watering pipe 658 and configured to detect data of the ground. In the above embodiments, the watering pipe 658 may include at least one projection 644 extending downwards from a bottom distal end opening of the watering pipe 658, and each of the at least one projection 644 may have a concave surface configured to form an air pocket into the ground as shown in FIG. 5C.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. For example, the most basic form of the present invention would only include a timer, power source, water valve, watering pipe with braces and no sensors. As another example, the present invention may work in most types of soils, including clay. As a further example, all of the embodiments may be comprised of modularized parts. For example, control box 108 may be separate from water pipe 110, and/or solar panel 104 may be positioned at a different location and need not be physically associated with water pipe 104, etc. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, lateral, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

Further the terms "a" and "an" throughout the disclosure (and in particular, claims) do not denote a limitation of quantity, but rather denote the presence of at least one of the referenced item.

The use of the phrases "and or," "and/or" throughout the specification (if any used) indicate an inclusive "or" where for example, A and or B should be interpreted as "A," "B," or both "A and B."

In addition, any element in a claim that does not explicitly state "means for" performing a specified function, or "step for" performing a specific function, is not to be interpreted as a "means" or "step" clause as specified in 35 U.S.C. Section 112f. In particular, the use of "step of," "act of," "operation of," or "operational act of" in the claims herein is not intended to invoke the provisions of 35 U.S.C. 112f.

What is claimed is:

1. A system comprising:
    at least one irrigation device configured to deliver water to below a ground surface at a selected depth, the irrigation device including:
        a first watering pipe configured to be inserted into the ground at the selected depth to deliver water;
        a probe including at least one sensor configured to be inserted into the ground, wherein the at least one sensor is configured to detect data of the ground and transmit the detected data to an electrical controller circuitry; and
        a control box configured to receive the detected data via the electrical controller circuitry and control an opening and closing of an inlet valve between the first watering pipe and a water main, based on the received data;
        wherein the first watering pipe has an elongated, longitudinally extending slot opening within a part of which the probe is secured external to the watering pipe.

2. The system of claim 1, wherein the at least one sensor includes a middle positioned sensor located at the selected depth and at least one of a top positioned sensor located above the selected depth and a bottom positioned sensor located below the selected depth, and
    wherein when the at least one of the top positioned sensor and the bottom positioned sensor detects moisture while the middle positioned sensor detect moisture, the at least one of the top positioned sensor and the bottom positioned sensor that detects moisture transmits a signal to the electrical controller circuitry to close the inlet valve.

3. The system of claim 1, wherein the irrigation device further includes a solar power module connected to the control box.

4. The system of claim 1, wherein the control box includes a watering pipe housing receiving and housing a top distal end of the watering pipe, and
    wherein the watering pipe is supplied water through a conduit channel connected to the inlet valve disposed inside the control box, and wherein the watering pipe housing is a longitudinally extending cylindrical hole with a longitudinally extending protruding portion formed on an inner surface of the hole.

5. The system of claim 4, wherein the control box includes a probe housing positioned at a bottom of the control box for receiving and housing a top distal end of the probe, and
    wherein the probe housing is a longitudinally extending cylindrical hole positioned inside the longitudinally extending protruding portion of the watering pipe housing.

6. The system of claim 5, wherein the watering pipe has an elongated hollow cylindrical shape that includes a top longitudinally extending slot and a bottom longitudinally extending slot that is extended from a bottom end of the top longitudinally extending slot and has a narrower width than the top longitudinally extending slot,
    wherein a top portion of the watering pipe is inserted into the watering pipe housing while the top longitudinally extending slot of the watering pipe receives the protruding portion of the watering pipe housing, and
    wherein a dividing edges between the top and bottom longitudinally extending slot functions as a stops upon which the protruding portion of the watering pipe housing sits and the bottom side of the control box rests.

7. The system of claim 6, wherein the probe housing positioned inside the longitudinally extending protruding portion is aligned with a second longitudinally extending slot, and wherein a top distal end of the probe is inserted within the probe housing, and a top section of the probe below the top distal end is embedded within the second longitudinally extending slot.

8. The system of claim 1, wherein the watering pipe includes at least one projection that linearly extends longitudinally from a bottom distal end opening of the watering pipe and is configured to support an excavated hole of the ground.

9. The system of claim 1, further comprising at least one second watering pipe,
wherein any one of the at least one irrigation device and the at least one second watering pipe are connected to each other in series.

10. The system of claim 1, wherein the at least one irrigation device is a plurality of irrigation devices, and
wherein the plurality of irrigation devices are connected to each other via at least one of a series circuitry and a parallel circuitry.

11. The system of claim 1, wherein the irrigation device further includes a water jet mechanism extended through the watering pipe from the inside of the control box toward a water egressing opening of the watering pipe,
wherein one end of the water jet mechanism is inserted into the control box, and the other end is exposed through the water egressing opening, and
wherein the water jet mechanism is configured to form an air pocket into the ground.

12. A system comprising:
at least one irrigation device configured to deliver water to below a ground surface, the irrigation device including:
a watering pipe configured to be inserted into the ground and including:
at least one egressing opening formed at a side of the watering pipe, and
a water jet mechanism configured to form an air pocket into the ground in front of the at least one egressing opening; and
a probe extended along the watering pipe and configured to detect data of the ground.

13. The system of claim 12, wherein the watering pipe includes at least one projection extending downwards from a bottom distal end opening of the watering pipe; and
wherein each of the at least one projection has a concave surface configured to form an air pocket into the ground.

* * * * *